(12) United States Patent
Wilde et al.

(10) Patent No.: US 7,416,189 B2
(45) Date of Patent: Aug. 26, 2008

(54) VEHICLE RIDE CONTROL SYSTEM

(75) Inventors: Michael D. Wilde, Cedar Springs, MI (US); John G. Hart, Mt. Clemens, MI (US); Abhinav Kumar, Grand Rapids, MI (US)

(73) Assignee: Spartan Motors Chassis, Inc., Charlotte, MI (US)

( * ) Notice: Subject to any disclaimer, the term of this patent is extended or adjusted under 35 U.S.C. 154(b) by 409 days.

(21) Appl. No.: 11/060,055

(22) Filed: Feb. 17, 2005

(65) Prior Publication Data

US 2006/0181034 A1   Aug. 17, 2006

(51) Int. Cl.
  *B60G 21/045*   (2006.01)
(52) U.S. Cl. .............. 280/5.504; 280/5.514; 280/5.515; 280/124.16
(58) Field of Classification Search .............. 280/5.515, 280/85.503, 5.504, 5.514, 5.512, 124.158, 280/124.159, 124.16; 701/37, 38
  See application file for complete search history.

(56) References Cited

U.S. PATENT DOCUMENTS

| | | | |
|---|---|---|---|
| 4,468,050 A | 8/1984 | Woods et al. | |
| 4,468,739 A | 8/1984 | Woods et al. | |
| 4,634,142 A | 1/1987 | Woods et al. | |
| 4,651,838 A | 3/1987 | Hamilton et al. | |
| 4,722,548 A | 2/1988 | Hamilton et al. | |
| 4,783,089 A | 11/1988 | Hamilton et al. | |
| 4,936,423 A * | 6/1990 | Karnopp .................. 188/266.5 |
| 4,973,080 A * | 11/1990 | Ikemoto et al. .......... 280/5.501 |
| 5,071,158 A * | 12/1991 | Yonekawa et al. ....... 280/5.514 |
| 5,529,152 A | 6/1996 | Hamilton et al. | |
| 5,735,372 A | 4/1998 | Hamilton et al. | |
| 5,968,102 A * | 10/1999 | Ichimaru et al. .............. 701/37 |
| 6,208,920 B1 * | 3/2001 | Izawa et al. ................... 701/36 |
| 6,282,470 B1 * | 8/2001 | Shono et al. .................. 701/37 |
| 6,298,292 B1 * | 10/2001 | Shono et al. .................. 701/37 |
| 6,321,887 B1 * | 11/2001 | Kurusu et al. ............. 188/266.2 |
| 6,394,238 B1 * | 5/2002 | Rogala .................... 188/266.2 |
| 6,502,837 B1 | 1/2003 | Hamilton et al. | |
| 6,575,484 B2 * | 6/2003 | Rogala et al. ......... 280/124.158 |
| 6,679,504 B2 * | 1/2004 | Delorenzis et al. ....... 280/5.507 |
| 2003/0001346 A1 | 1/2003 | Hamilton et al. | |
| 2005/0098401 A1 | 5/2005 | Hamilton et al. | |
| 2006/0287791 A1 * | 12/2006 | Boon et al. .................... 701/38 |

* cited by examiner

*Primary Examiner*—Toan C To
(74) *Attorney, Agent, or Firm*—Warner Norcross & Judd LLP

(57) ABSTRACT

A ride control suspension control system having suspension control units with a damper and a single pressure regulator that controls dampening in both the compression and rebound chambers of the damper. The fluid control circuit may include a plurality of check valves that coordinate the flow of fluid to and from both chambers through the pressure regulator. In one embodiment, the system includes a central controller that receives input from a variety of sensors and directly controls operation the pressure regulators in each of the suspension control units without the need for any remote processors. The ride control suspension system may also include wheel position sensors that are external to the accumulator.

17 Claims, 15 Drawing Sheets

VEHICLE RIDE CONTROL SYSTEM

BACKGROUND OF THE INVENTION

The present invention relates to vehicle ride control systems and more particularly to a control system for controlling vehicle ride in real-time.

A variety of vehicle ride control systems have been developed to provide real-time control over vehicle ride. For example, ride control systems have been developed to adjust in real-time the damping forces of a damper, such as a hydraulic shock, during both compression and rebound in response to road irregularities and other vehicle conditions. These adjustments are made as a function of a variety of factors, including a variety of sensed variables that are indicative of acceleration, deceleration, cornering, road impacts and other similar vehicle characteristics. One system designed to generate a constant compression and/or rebound force at a wheel is disclosed in PCT International Publication No. WO 96/05975, which is entitled Computer Optimized Adaptive Suspension System and Method Improvements and was published on Feb. 29, 1996. PCT International Application No. WO 96/05975 is incorporated herein by reference in its entirety. Since the development of the suspension system disclosed in WO 96/05975, a number of improvements in its control system and control methodology have been developed. A number of these improvements are disclosed in U.S. Pat. No. 6,502,837, which is entitled "Enhanced Computer Optimized Adaptive Suspension System And Method" and issued to Hamilton et al on Jan. 7, 2003. U.S. Pat. No. 6,502,837 is incorporated herein by reference in its entirety.

Although existing vehicle ride control suspension systems can provide marked improvement in handling, comfort and control of a vehicle, experience has revealed that the more effective conventional systems are excessively large and difficult to fit into the space available in existing vehicles. As a result, the commercial acceptance of ride control suspension systems has been somewhat limited. For example, in actual implementation, the ride control system of the references identified above includes a suspension control unit located at each wheel. Each suspension control unit includes a hydraulic damper with separate pressure regulators for the compression and rebound chambers, along with a fluid accumulator. Each suspension control unit also includes a separate computer controller and associated housing that is packaged with the mechanical and hydraulic components. Further, each suspension control unit includes an accumulator having an integrated LVDT that determines wheel position based essentially on the position of the piston within the accumulator. As a result of the expansion and contraction in oil volume that occurs with changes in temperature, the integrated wheel position sensor requires complicated algorithms to provide proper compensation for temperature-based changes in oil volume. In combination, the components of these prior systems are relatively bulky and rather difficult to fit into the packaging constraints of many conventional vehicle designs. Further, at least some of the components of these prior systems operate at a high level of complexity, thereby increasing cost and potentially reducing reliability. The systems are also relatively expensive to manufacture and assemble, thereby further reducing the commercial appeal of ride control suspension systems.

Accordingly, there is a long-felt and unmet need for an effective and reliable vehicle ride control suspension system that satisfies the packaging requirements of conventional vehicle designs and is economical to produce.

SUMMARY OF THE INVENTION

The aforementioned problems are overcome by the present invention wherein a vehicle ride control suspension system is provided with a suspension control unit having a damper and fluid control circuit with a single pressure regulator for controlling the damping force in both the compression and rebound chambers of the damper. In one embodiment, the system includes one suspension control unit located at each wheel and a controller that controls and coordinates operation of all of the suspension control units.

In one embodiment, the fluid control circuit further includes an accumulator and a plurality of check valves that route fluid between the damper, accumulator and pressure regulator to permit the single pressure regulator to control the damping force of both the compression and rebound sides of the damper.

In another embodiment, the fluid control circuit, including the pressure regulator, check valves and accumulator, is integral with damper such that external fluid lines are not required between the various components. In this embodiment, all fluid paths are defined within the structure of the suspension control unit.

In another embodiment, the ride control suspension system includes a wheel position sensor that is external to the accumulator. The external wheel position sensor may be mounted between the unsprung mass (e.g. wheel, axle or control arm) and the sprung mass (e.g. frame or chassis) to provide signals indicative of the position of the wheel with respect to the frame. In one implementation of this embodiment, each suspension control unit includes a separate external wheel position sensor.

In a further embodiment, the ride control suspension system includes a single central controller that controls operation of the various suspension control units. The central controller receives input from a variety of sensors, which may include input from sensors installed with the system (such as wheel position and steering angle sensors) or input from sensors existing within the vehicle (such as speed, brake and ignition inputs). The central controller processes the input using a variety of control algorithms to generate control signals for the suspension control units. The central controller may execute the control algorithms separately for each suspension control unit to provide separate control signals for each. The central controller may apply the control signals directly to the pressure regulator for each of the suspension control units.

The present invention provides a simple and effective ride control suspension system. The suspension control units of the present invention require only a single pressure regulator and are therefore relatively small allowing the unit to more readily fit into the packaging constraints of existing vehicles. The integrated nature of the various elements of the fluid control circuit provides a unit that is easily installed without the need for laborious on-vehicle assembly. The use of external wheel position sensors avoids complexity inherent in preexisting systems, thereby reducing the overall cost of installation and maintenance. The use of a single central controller simplifies operation and maintenance, and therefore also reduces the overall cost of installation and maintenance of the system.

These and other objects, advantages, and features of the invention will be readily understood and appreciated by reference to the detailed description of the preferred embodiment and the drawings.

DETAILED DESCRIPTION OF THE PREFERRED EMBODIMENT

I. Overview.

Figure 1:
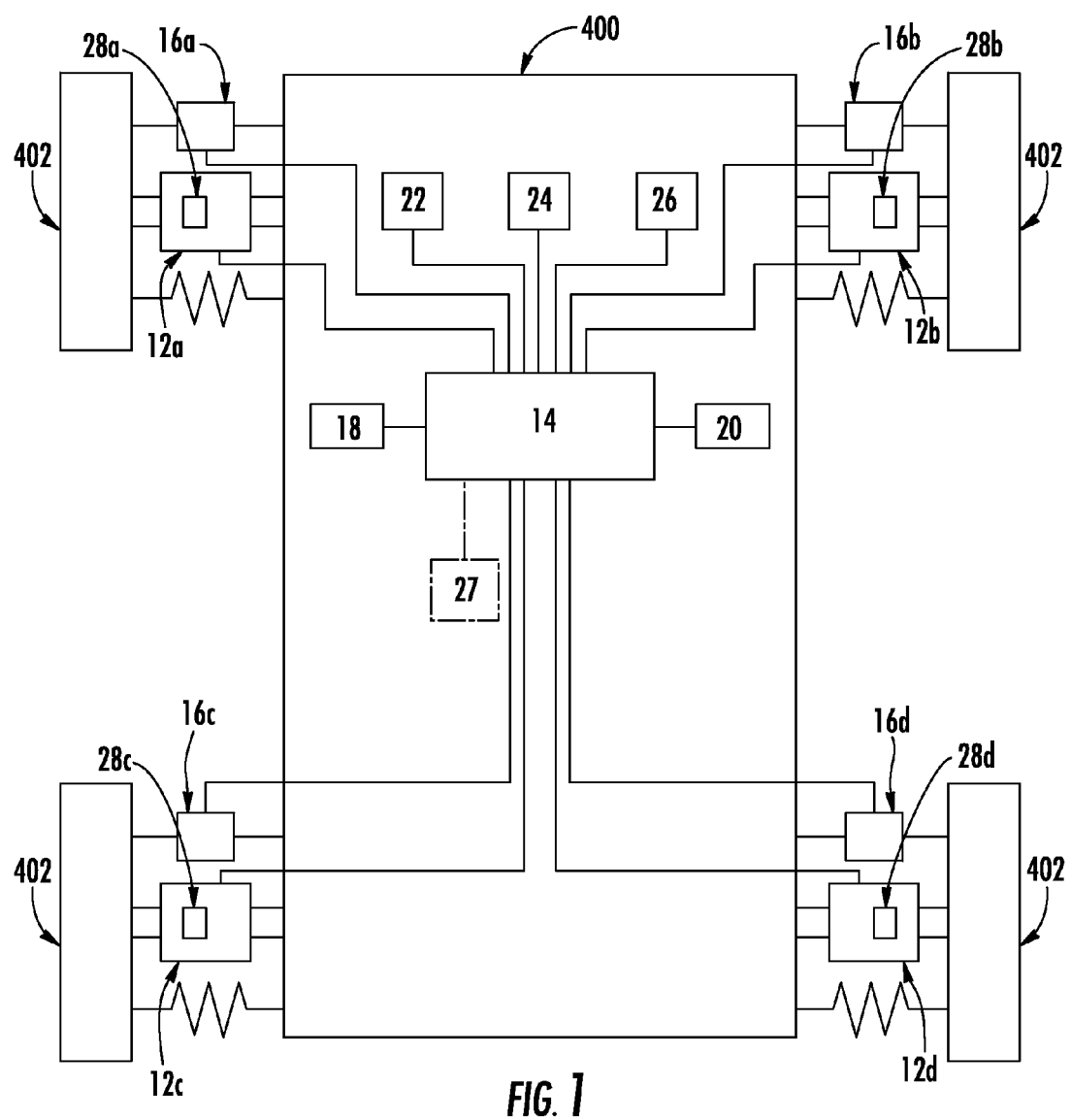
FIG. 1 is a schematic diagram of a vehicle ride control suspension system in accordance with an embodiment of the present invention.

A vehicle ride control suspension system in accordance with an embodiment of the present invention is shown schematically in FIG. 1 and generally designated 10. In this embodiment, the system 10 generally includes four suspension control units 12a-d (one located at each wheel), a plurality of sensors (e.g. wheel position sensors 16a-d, steering angle sensor 18, lateral and longitudinal axes accelerometer 20, brake sensor 22, ignition sensor 24, speed sensor 26 and solenoid feedback sensors 28a-d) disposed at various locations about the vehicle, and a central controller 14 for processing the input from the various sensors and separately controlling operation of the plurality of suspension control units 12a-d. The various sensors provide information indicative of various conditions encountered by the vehicle, such as road irregularities, cornering, braking and acceleration. In operation, the central controller 14 obtains input from the various sensors and separately determines the appropriate damping force that should be applied at each corner of the vehicle to address the sensed conditions. The system 10 operates in real-time during driving to constantly adjust to changing conditions to provide optimal ride. The present invention is described in connection with a conventional automotive installation, such as might be installed on a conventional recreational vehicle chassis. In this embodiment, the system includes four suspension control units 12a-d, one mounted at each wheel. The present invention is however well-suited and readily adapted for use in other applications, including both wheeled and track vehicles, where the number of suspension control units may vary.

II. Components.

As noted above, the system 10 generally includes a central controller 14, a plurality of suspension control units 12a-d (sometimes referred to herein as "SCUs") and a plurality of sensors that are mounted in various locations about the vehicle 400. In the illustrated embodiment, the system 10 includes four essentially identical suspension control units 12a-d that are mounted at the wheels 402 in the four corners of the vehicle 400. The suspension control units 12a-d are controlled separately to provide essentially independent control at each wheel 402. In this embodiment, the four suspension control units 12a-d are essentially identical to one another. Accordingly, this disclosure will focus on the construction and operation of a single suspension control unit 12a. When desired, the suspension control units may, however, vary from one location to the next. For example, in some applications it may be desirable to provide the dampers of the rear suspension control units with a longer stroke (or range of motion) than the dampers of the front suspension control units. As another example, it may desirable to scale up the rear suspension control units to accommodate heavier loads in the rear of the vehicle. In the described embodiment, the suspension control units 12a-d are hydraulic systems. The present invention is not, however, limited to hydraulic systems, and the suspension control units may alternatively be pneumatic or other fluid-type systems.

Figure 2:
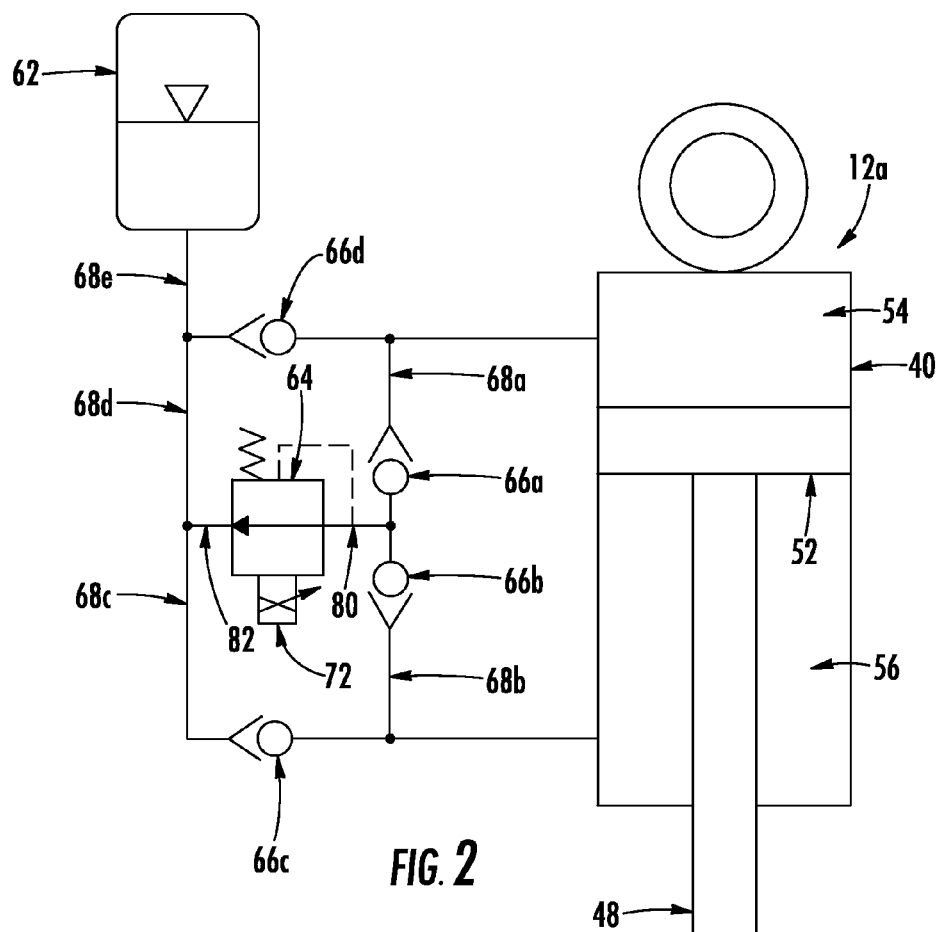
FIG. 2 is a schematic diagram of a suspension control unit.
Figure 3:
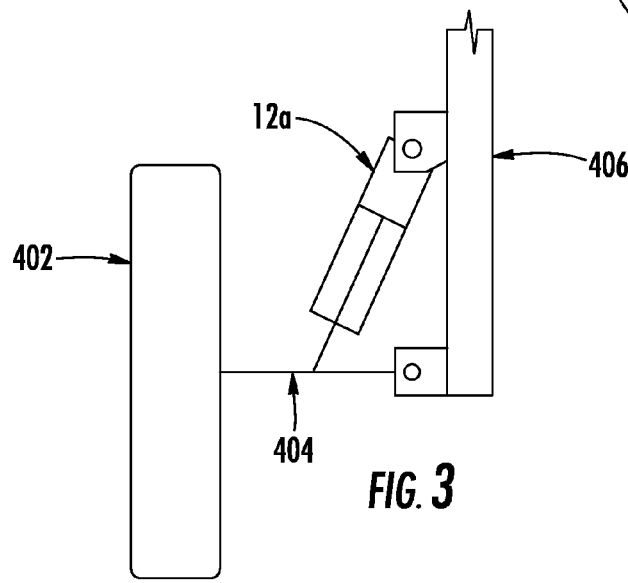
FIG. 3 is a schematic representation of a suspension control unit mounted between an un-sprung mass and a sprung mass.

FIG. 2 is a schematic representation showing an overview of the circuit of the suspension control unit 12a of one embodiment. In this embodiment, the suspension control unit 12a generally includes a damper 40 having a compression chamber 54 and a rebound chamber 56, as well as a fluid control circuit 42 that controls the flow of fluid between the compression chamber 54 and the rebound chamber 56. The fluid control circuit 42 generally includes an accumulator 62, a pressure regulator 64, a plurality of check valves 66a-d and a plurality of flow paths 68a-e. The fluid flow paths include a flow path 68a that provides fluid communication between the compression chamber 54 and the inlet 80 of the pressure regulator 64. A check valve 66a (or other one-way components) in disposed along flow path 68a to prevent fluid flow from the inlet 80 to the compression chamber 54. The circuit 42 also includes a fluid path 68b that interconnects the rebound chamber 56 and the inlet 80. A check valve 66b (or other one-way components) in disposed along flow path 68b to prevent fluid flow from the inlet 80 to the rebound chamber 56. The circuit further includes a fluid path 68c interconnecting the outlet 82 of the pressure regulator 64 to the rebound chamber 56. A check valve 66c (or other one-way components) in disposed along flow path 68c to prevent fluid flow from the rebound chamber 56 to the outlet 82. A fluid path 68d also interconnects the outlet 82 of the pressure regulator 64 to the compression chamber 56. A check valve 66d (or other one-way components) in disposed along flow path 68d to prevent fluid flow from the outlet 82 of the pressure regulator 64 to the compression chamber 54. In this embodiment, the fluid control circuit 42 further includes flow path 66e providing fluid communication between the accumulator 62, the outlet 82, the compression chamber 54 and the rebound chamber 56. Check valve 66c prevents direct fluid flow from the rebound chamber 56 to the accumulator 62. Similarly, check valve 66d prevents direct fluid flow from the compression chamber 54 to the accumulator 62. The fluid flow paths 68a-e and the check valves 66a-d cooperatively direct the flow of high pressure fluid from either the compression chamber 54 or the rebound chamber 56 to the inlet 80 of the pressure regulator 64 and then from the outlet 82 to the opposite chamber 54 or 56. The fluid flow paths 68a-e and check valves 66a-d also provide proper integration and isolation of the accumulator 62 so that fluid can be stored or withdrawn as necessary. This circuit 42 may be implemented in a variety of different ways; however, for purposes of disclosure one implementation is described herein.

Figure 4:
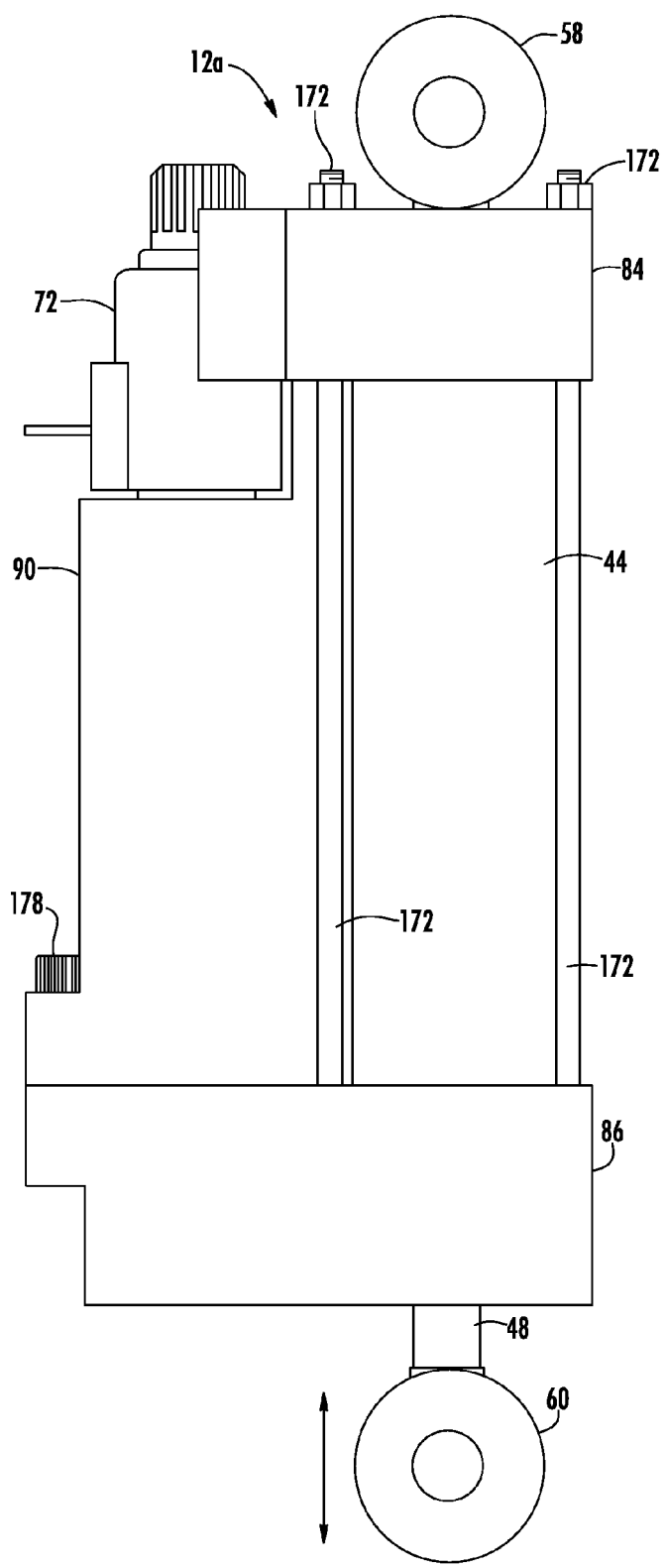
FIG. 4 is a front elevational view of a suspension control unit.
Figure 5:
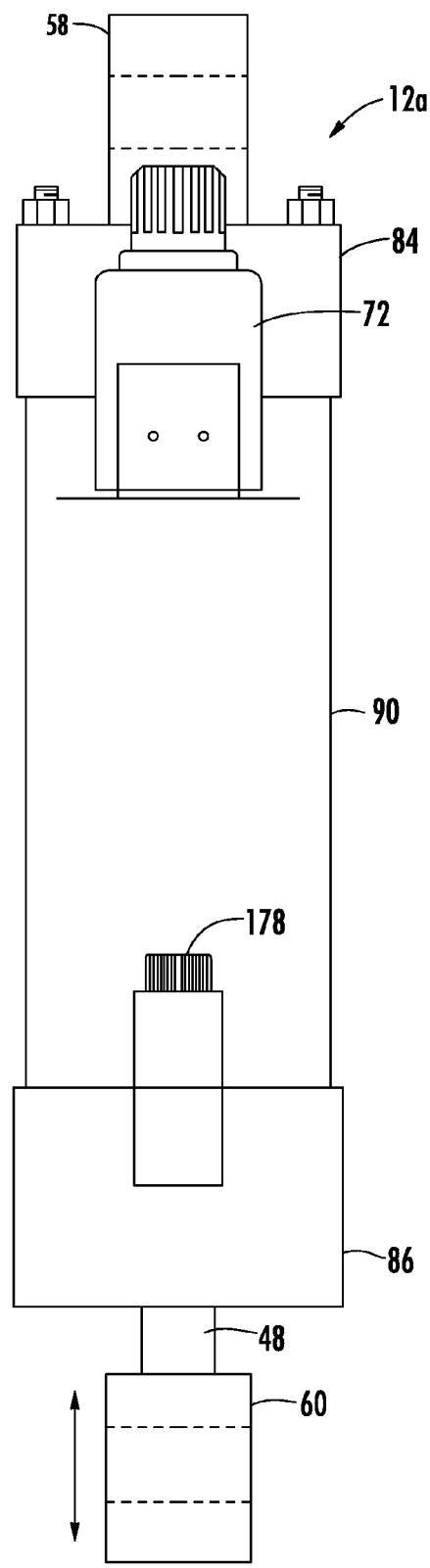
FIG. 5 is a side elevational view of a suspension control unit.

FIGS. 4 and 5 are elevational views of one embodiment of a suspension control unit 12a. In this embodiment, the various elements of the suspension control unit 12a are packaged together to provide a relatively small profile. In general, the accumulator 62 and pressure regulator 64 are mounted to and carried by the damper 40 in a low profile arrangement. The check valves 66a-d and flow paths 200-210 are integrated into the package as described in more detail below. The damper 40 of this embodiment is generally conventional and includes a damper cylinder 44 defining an internal space 46 to receive hydraulic fluid, a rod 48 extending from the cylinder 44 and a piston 52 mounted to the rod 48 and contained within the internal space 46. A first mounting ring 58 is affixed to the top end of the damper 40 and a second mounting ring 60 is affixed to the exposed end of rod 48. The piston 52 divides the internal space 46 of the cylinder 44 into separate compression and rebound chambers, 54 and 56 respectively (See FIG. 6). The terms "top" and "bottom" are used herein to refer conventional spatial relationships when the suspension control unit 12a is mounted in the somewhat vertical orientation shown in the illustrated embodiment. The suspension control unit 12a is not limited to the orientation of the illustrated embodiment and may be mounted in essentially any orientation. Accordingly, use of the terms "top" and "bottom" in connection with this description should not be interpreted as limiting the present invention to applications in which the suspension control units 12a-d are mounted in a specific orientation.

Figure 8A:
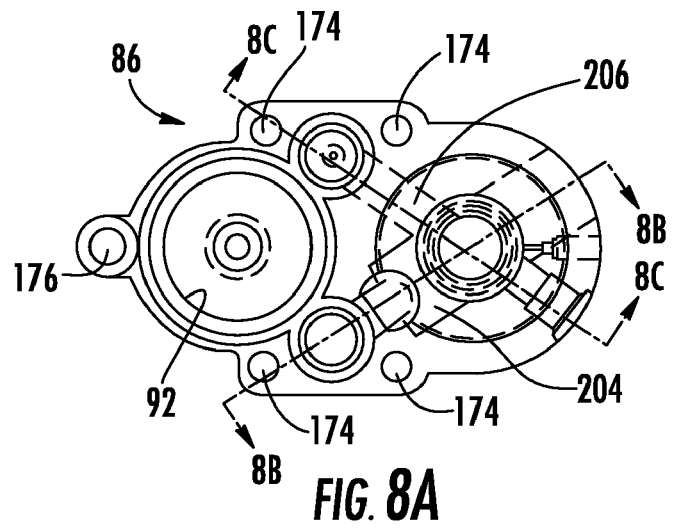
FIG. 8A is a top plan view of the top end cap.
Figure 8B:
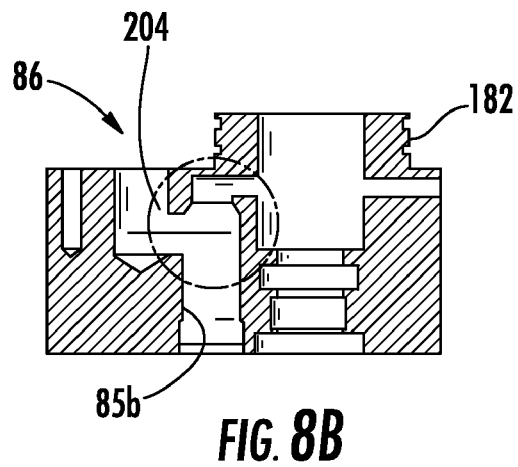
FIG. 8B is a sectional view of the top end cap taken along line 8B-8B of FIG. 8A.
Figure 8C:
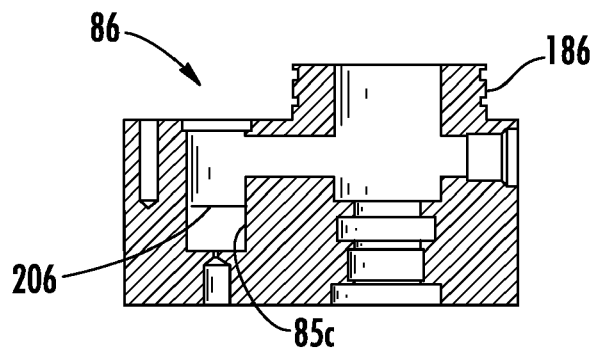
FIG. 8C is a sectional view of the top end cap taken along line 8C-8C of FIG. 8A.
Figure 9B:
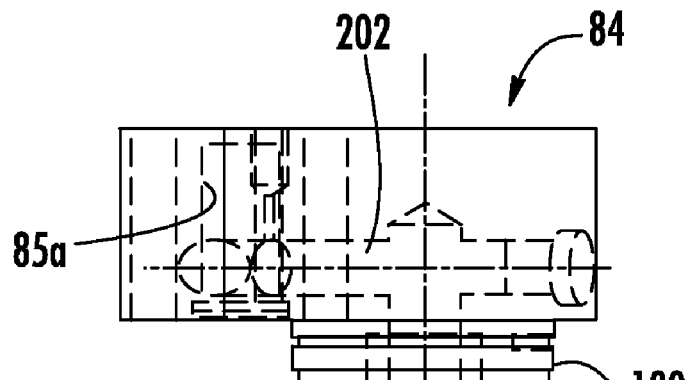
FIG. 9B is a sectional view of the bottom end cap taken along line 9B-9B of FIG. 9A.
Figure 9A:
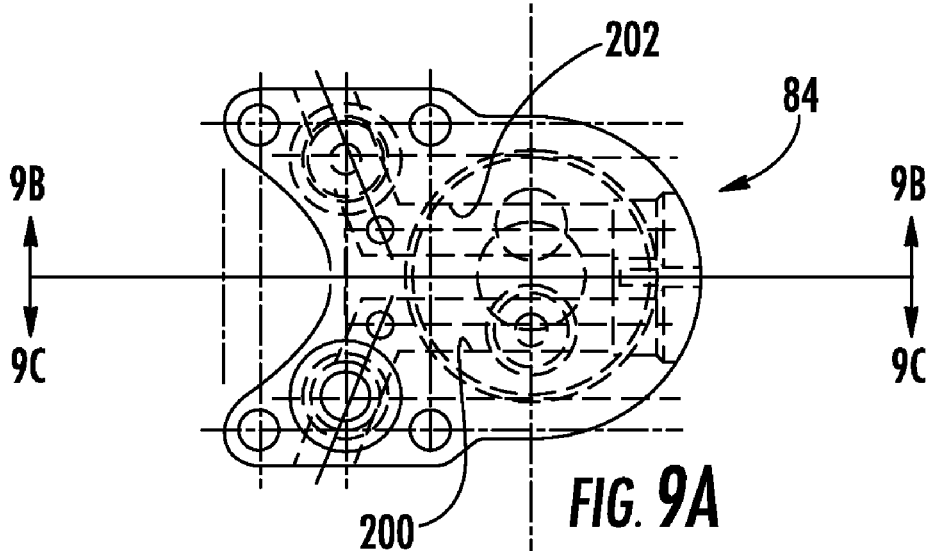
FIG. 9A is a top plan view of the bottom end cap.
Figure 9C:
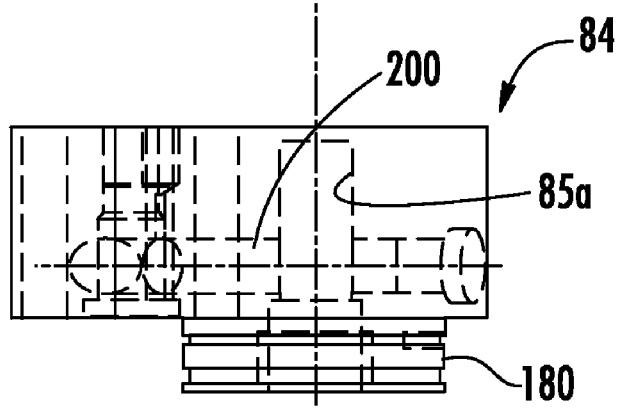
FIG. 9C is a sectional view of the bottom end cap taken along line 9C-9C of FIG. 9A.
Figure 10A:
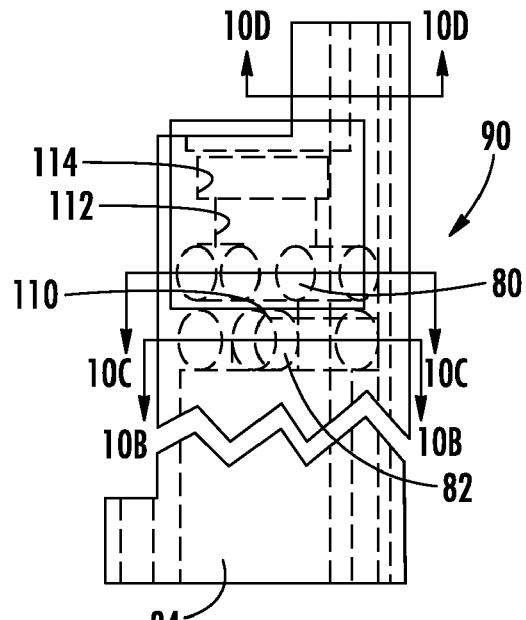
FIG. 10A is a side elevational view of the shock body.
Figure 10B:
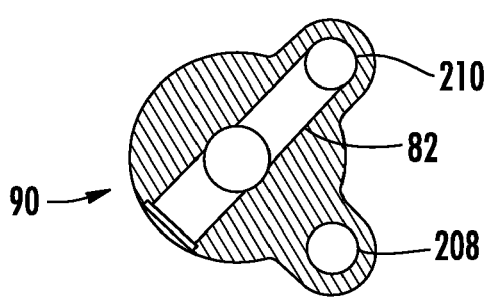
FIG. 10B is a sectional view of the shock body taken along line 10B-10B of FIG.
Figure 10C:
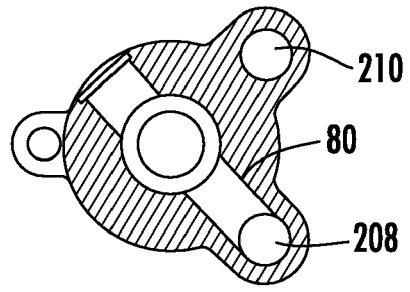
FIG. 10C is a sectional view of the shock body taken along line 10C-10C of FIG.
Figure 10D:
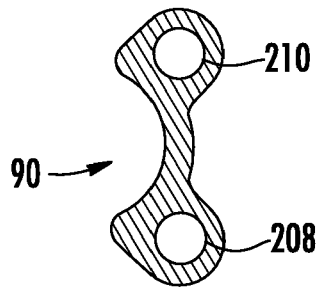
FIG. 10D is a sectional view of the shock body taken along line 10D-10D of FIG. 10A.

The suspension control unit 12a also includes a top end cap 84 and a bottom end 86 cap that close opposite ends of the damper cylinder 44 and the shock body 90 (described below). The top end cap 84 includes a neck 180 that is fitted tightly within the top end of the damper cylinder 44 in a leaktight relationship. The top end cap 84 defines a plurality of flow paths 200 and 202 that cooperate with the shock body 90 to provide fluid communication between the compression chamber 54, the pressure regulator 64 and the accumulator 62. These flow paths 200 and 202 are described in more detail with reference to FIGS. 9A-C. Outlet flow path 200 interconnects the compression chamber 54 with the inlet of the pressure regulator 64 via flow path 208 in the shock body 90. Check valve 66a is seated in seat 85a (See FIG. 9C) in the outlet flow path 200 to prevent pressurized fluid from flowing into the compression chamber 54 through the outlet flow path 200. Inlet flow path 202 interconnects the compression chamber 54 with the outlet of pressure regulator 64 and the accumulator 62 via flow path 210 in the shock body 90. Check valve 66d is seated in seat 85d (See FIG. 9B) in the inlet flow path 202 to prevent pressurized fluid from flowing out of the compression chamber 54 through the inlet flow path 202. The top end cap 84 may also define four through bores 170 for interconnecting the top end cap 84 and bottom end cap 86 by threaded rods 172. The bottom end cap 86 closes the bottom end of the damper cylinder 44 and the shock body 90. The bottom end cap 86 includes a neck 182 that is fitted within the bottom end of the damper cylinder 44 in a leaktight relationship. The bottom end cap 86 defines a plurality of flow paths 204 and 206 that cooperate with the shock body 90 to provide fluid communication between the rebound chamber 56, the pressure regulator 64 and the accumulator 62. These flow paths 204 and 206 are described in more detail with reference to FIGS. 8A-C. Outlet flow path 204 interconnects the rebound chamber with the inlet of the pressure regulator 64 via flow path 208 in the shock body 90. Check valve 66b is seated in seat 85b (See FIG. 8B) in the outlet flow path 204 to prevent pressurized fluid from flowing into the rebound chamber 56 through outlet flow path 204. Inlet flow path 206 interconnects the rebound chamber 54 with the outlet of pressure regulator 64 and the accumulator 62 via flow path 210 in the shock body 90. Check valve 66c is seated in seat 85c (See FIG. 8C) in the inlet flow path 206 to prevent pressurized fluid from flowing out of the rebound chamber 56 through inlet flow path 206. The bottom end cap 86 also defines a cylindrical bore 92 that cooperates with the shock body 90 (as described in more detail below) to define the accumulator 62. The bottom end cap 86 may also define four threaded bores 174 for interconnecting the top end cap 86 and bottom end cap 86 by threaded rods 172, and a threaded bore 176 for connecting the shock body 90 and the bottom end cap 86 by bolt 178.

Figure 12A:
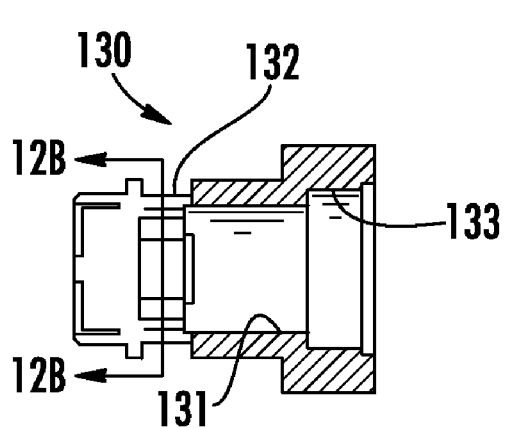
FIG. 12A is a partially sectional view of the control valve sleeve.
Figure 12B:
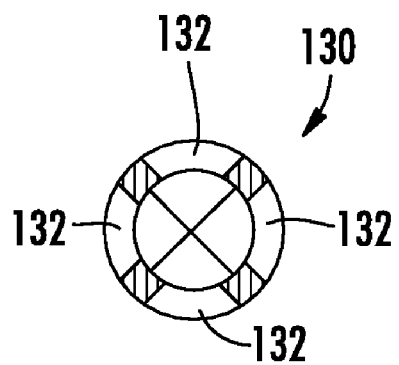
FIG. 12B is a sectional view of the control valve sleeve taken along line 12B-12B of FIG. 12A.
Figure 13A:
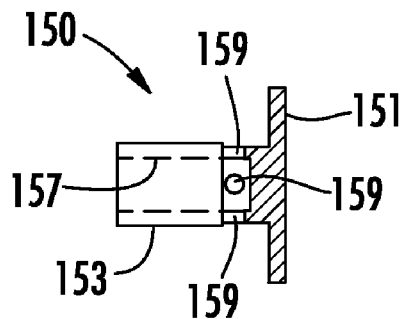
FIG. 13A is a partially sectional side elevational view of the control valve damper.
Figure 13B:
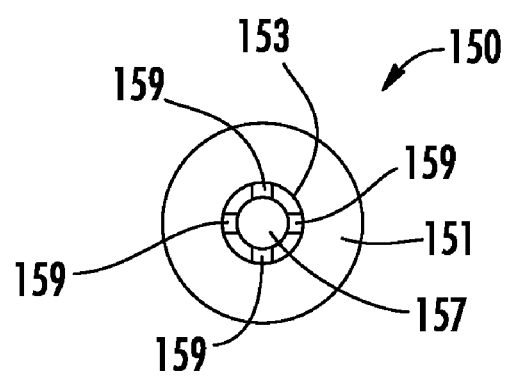
FIG. 13B is a bottom plan view of the control valve damper.
Figure 14:
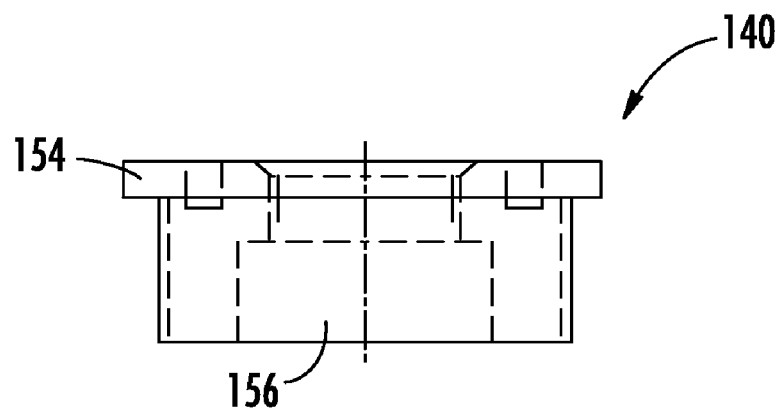
FIG. 14 is a partially sectional view of the solenoid adapter.

In this embodiment, the suspension control unit 12a includes a shock body 90 that is mounted between the top end cap 84 and the bottom end cap 86. As described in more detail below, the accumulator 62 and pressure regulator 64 are received within the shock body 90. Referring now to FIGS. 10A-D, the shock body 90 defines a cylindrical bore 94 that cooperates with cylindrical bore 92 in the bottom end cap 86 to define an internal space 96 that forms a portion of the accumulator 62. A piston 98 is fitted within the internal space 96 dividing the space 96 into a fluid chamber 104 and a charge chamber 106. The charge chamber 106 is charged in a conventional manner, for example, by high pressure nitrogen. The fluid chamber 104 is in fluid communication with the fluid control circuit 42 and may function as a reservoir for storing and withdrawing fluid as needed within the circuit 42. The shock body 90 further defines a plurality of coaxial cylindrical bores 110, 112, 114 and 115 adapted to receive various components of the pressure regulator 64. Bore 110 defines a flow path to the fluid chamber 104 of the accumulator 62 and seats the reduced diameter tip of control valve sleeve 130. Bore 112 seats a central portion of the control valve sleeve 130. Bore 114 seats the main body of the solenoid adapter 140. Bore 115 seats the annular shoulder 154 of the solenoid adapter 140. The control valve sleeve 130 is generally cylindrical having regions of differing internal and external diameter (See FIG. 12). In the illustrated embodiment, the control valve sleeve 130 defines a poppet bore 131 and a coaxial spring counter bore 133. The poppet bore 131 slidably receives the poppet 160. The control valve sleeve 130 also defines a series of radially-spaced inlets 132 that permit fluid to flow into the poppet bore 131 and work against the poppet 160. A spring 131 is fitted around the poppet 160 within spring counter bore 133 of the valve sleeve 130. The spring 131 holds the poppet 160 in an open position when the solenoid 72 is not energized. The exterior of the control valve sleeve 130 is configured to be fitted within the bores 110 and 112. A control valve damper 150 is slidably fitted within the poppet 160. The control valve damper 150 is generally cylindrical and includes a disc-shaped head 151 coupled with a cylindrical plug body 153 (See FIG. 13). The plug body 153 is fitted within the poppet 160 and defines a coaxial central bore 157 and a plurality of cross bores 159 that cooperatively provide fluid communication between the interior of the poppet 160 and the space about the head of the poppet 160 and the head of the plug body 153. Fluid filling this space helps to dampen the poppet 160 and the control valve damper 150. A resilient decoupler 152 is fitted into the poppet 160 below the control valve damper 150. The resilient decoupler 152 of this embodiment is a generally tubular sleeve that is relatively compressible and resilient to absorb a portion of any abrupt pressure changes that may confront the poppet 160. The length of the decoupler 152 is selected to maintain spacing between the head 151 of the control valve damper 150 and the head 163 of the poppet 160 when the poppet 160 is not under a load. The decoupler 152 may be manufactured from a material of sufficient compressibility to permit the head 151 of the control valve damper 150 to engage the head 163 of the poppet 160 once a sufficient load is applied to the poppet 160. The precise resiliency, compressibility and amount of spacing provided by the decoupler 152 may vary from application to application. The head 151 prevents the control valve damper 150 from moving too far into the poppet 160 providing direct engagement with the poppet 160 once the decoupler 152 has been sufficiently compressed. The solenoid 72 generally includes a coil 116 and a rod 118. The solenoid adapter 140 is generally ring-shaped having an annular shoulder 154 to engage the shock body 90 and defining a central opening 156 to seat the end of the solenoid 72 (See FIG. 14). The solenoid 72 is mounted to the shock body 90 with the coil 116 external to the shock body 90 and the rod 118 extending into the shock body 90 to bear against the control valve damper 150. The shock body 90 further defines a pair of flow paths 208 and 210 that extend longitudinally through the shock body 90 and provide fluid communication between the pressure regulator 64, accumulator 62 and the flow paths 200, 202, 204 and 206 in the end caps 84 and 86. More specifically, the shock body 90 of this embodiment defines an inlet flow path 208 that interconnects the inlet 80 of the pressure regulator 64 with compression chamber outlet flow path 200 and rebound chamber outlet flow path 204. Similarly, outlet flow path 210 interconnects the accumulator 62 and the outlet 82 of the pressure regulator 64 with compression chamber inlet flow path 202 and rebound chamber inlet flow path 206.

The suspension control unit 12a is installed on the vehicle 400 between the unsprung mass (e.g. the wheels and axles) and the sprung mass (e.g. the frame or chassis) to dampen any relative motion between the sprung and unsprung masses. In this embodiment, one end of the damper 40 is mounted to the sprung mass, for example, to the frame 406 by mounting ring 58 and the opposite end of the damper 40 is mounted to the unsprung mass, for example, by affixing the external end of the rod 48 to an axle 404 by mounting ring 60. In this way, relative motion between the sprung mass (e.g. the frame 406) and the unsprung mass (e.g. the wheel 402) results in movement of the rod 48 and the piston 52 within the internal space 46.

Figure 11A:
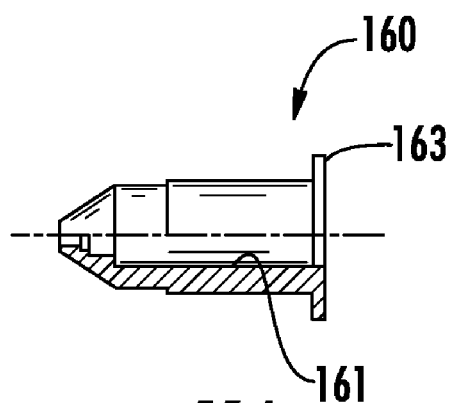
FIG. 11A is a partially sectional side elevational view of the poppet.
Figure 11B:
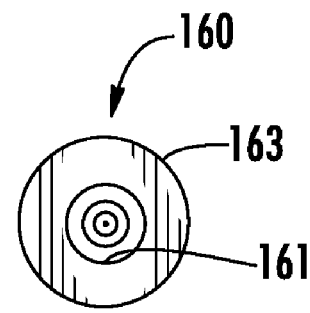
FIG. 11B is a top plan view of the poppet.
Figure 17A:
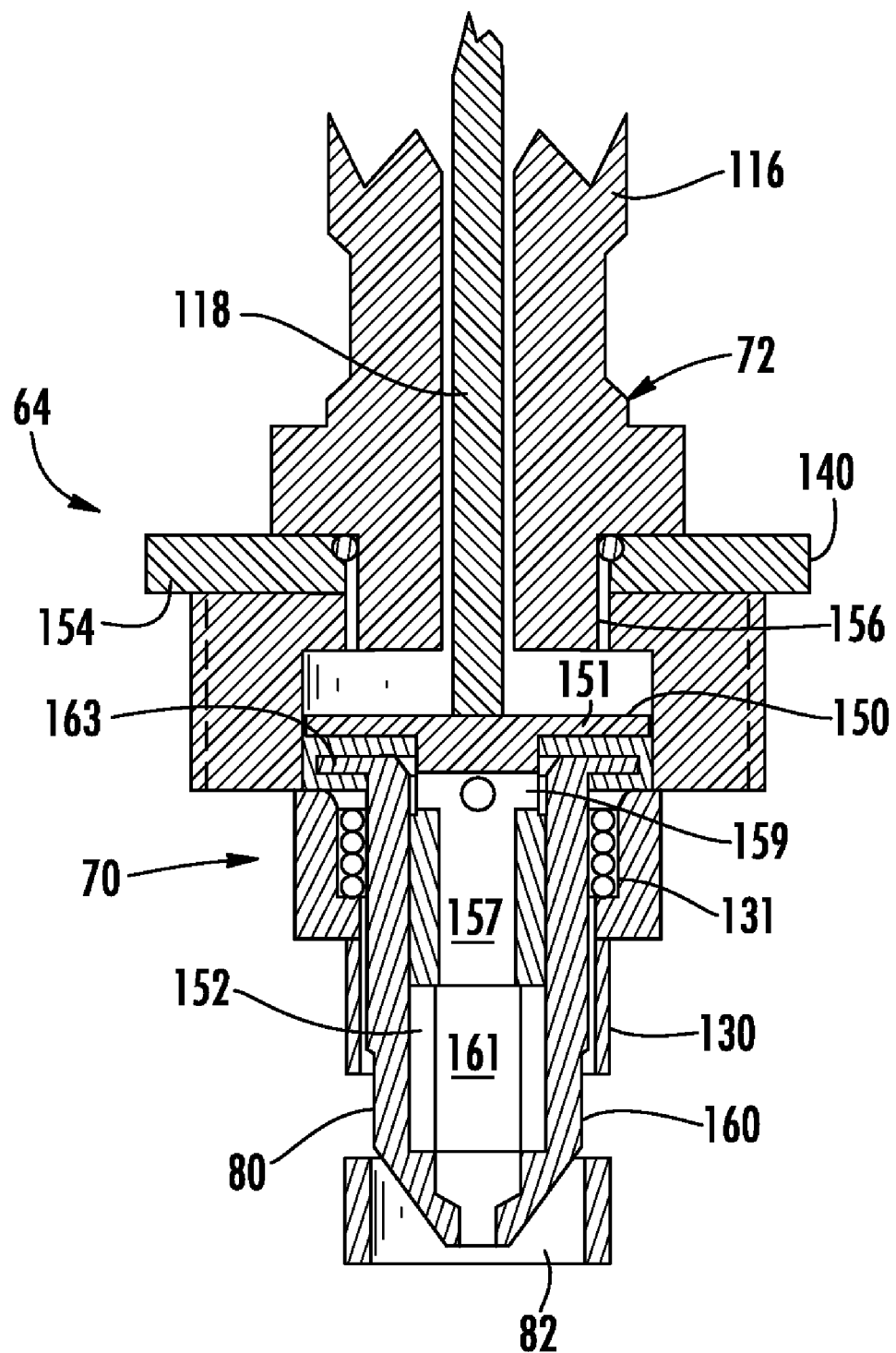
FIG. 17A is a sectional view of a relief valve.

By controlling the flow of hydraulic fluid between the compression chamber 54 and the rebound chamber 56, the suspension control unit 12a can selectively dampen the effects of road irregularities and otherwise affect the ride of the vehicle in terms of comfort and handling. The pressure regulator 64 of this embodiment generally includes a single-valve solenoid 72 and a proportional relief valve 70 with an inlet 80 and an outlet 82. The relief valve 70 is similar in construction and function to the control valves 28a-b disclosed in U.S. Pat. No. 6,502,837, and therefore will not be described in detail. Suffice it to say that the relief valve 70 provides a controlled restriction on the flow of fluid through the pressure regulator 64 and consequently the fluid control circuit 42. In doing so, the pressure regulator 64 controls the force required to move fluid between the compression chamber 54 and the rebound chamber 56. This, in turn, provides control over the damping forces applied by the suspension control unit 12a. As described in U.S. Pat. No. 6,502,837, the relief valve 70 includes a control valve sleeve 130, a poppet 160 movably seated with the sleeve 130, a control valve damper 150 movably seated in the poppet 160 and a solenoid adapter 140 (See FIG. 17A). The poppet 160 is movable with respect to the inlet 80 and outlet 82. Increasing fluid force causes the poppet 160 to retract into the relief valve 70. When sufficient fluid force is applied, the poppet 160 is retracted a sufficient distance to open fluid communication between the inlet 80 and the outlet 82 to permit the flow of fluid through the pressure regulator 64. Further increases in fluid pressure will cause the poppet 160 to retract even farther permitting greater fluid flow between the inlet 80 and the outlet 82. In the illustrated embodiment, the poppet 160 defines and internal coaxial through bore 161 that permits fluid to flow through the interior of the poppet 160 and provide a damping force about the head 163 of the poppet 160 and the head 151 of the control valve damper 150 (See FIGS. 11A and 11B).

Figure 17B:
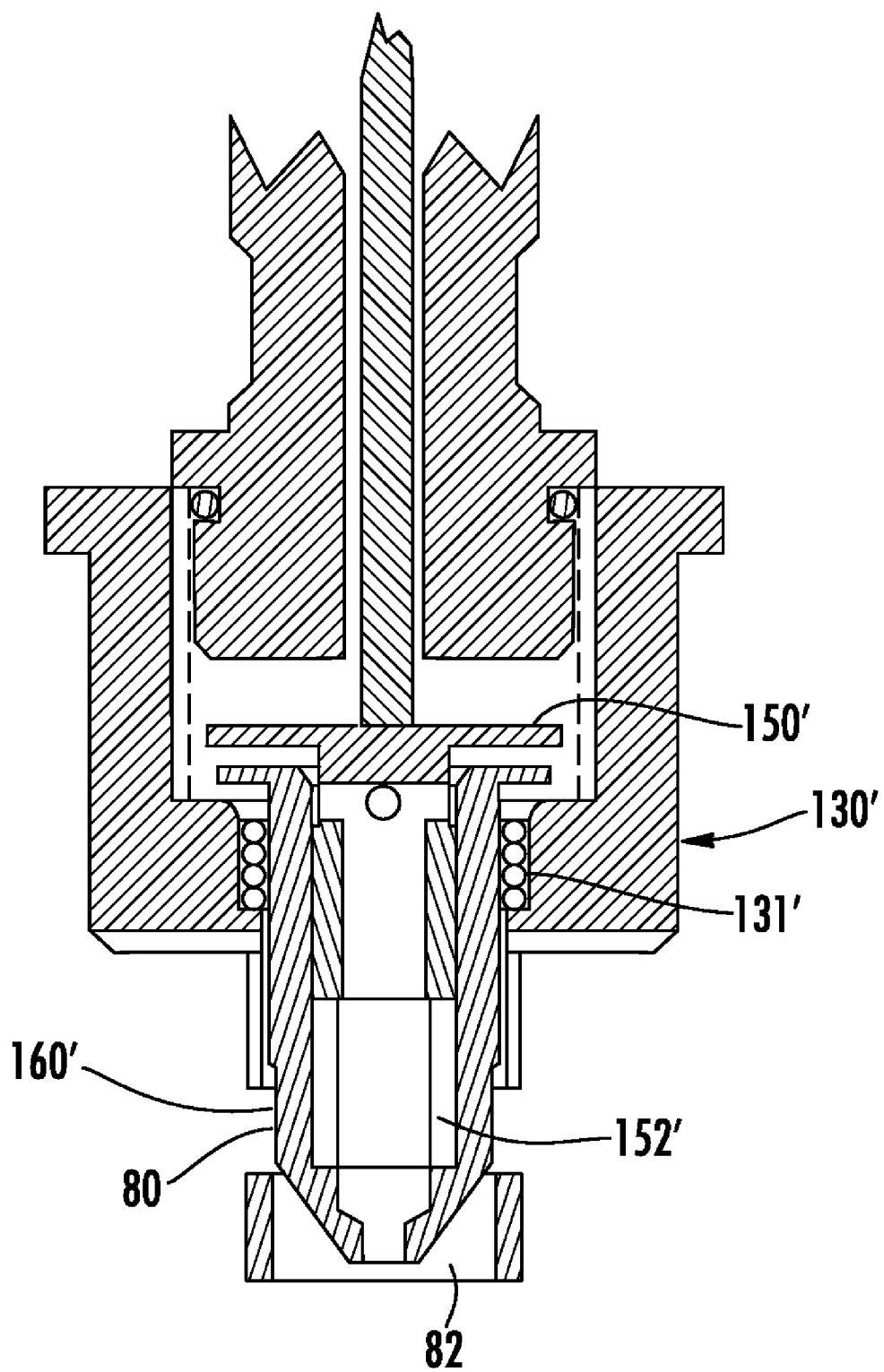
FIG. 17B is a sectional view of an alternative relief valve.

In an alternative embodiment, the relief valve may be configured as a cartridge that is easily installed within and removed from the shock body. An alternative cartridge-style relief valve 70' is shown in FIG. 17B. In this embodiment, the control valve sleeve and solenoid retainer are integrated into a single unit, thereby forming a single cartridge body 130'. The control valve damper 150', decoupler 152', poppet 160' and spring 131' are generally identical to those of the embodiment described above and are fitted into the cartridge body 130' in essentially the same manner as they are fitted into the separate control valve sleeve 130 and solenoid retainer 140.

Figure 6:
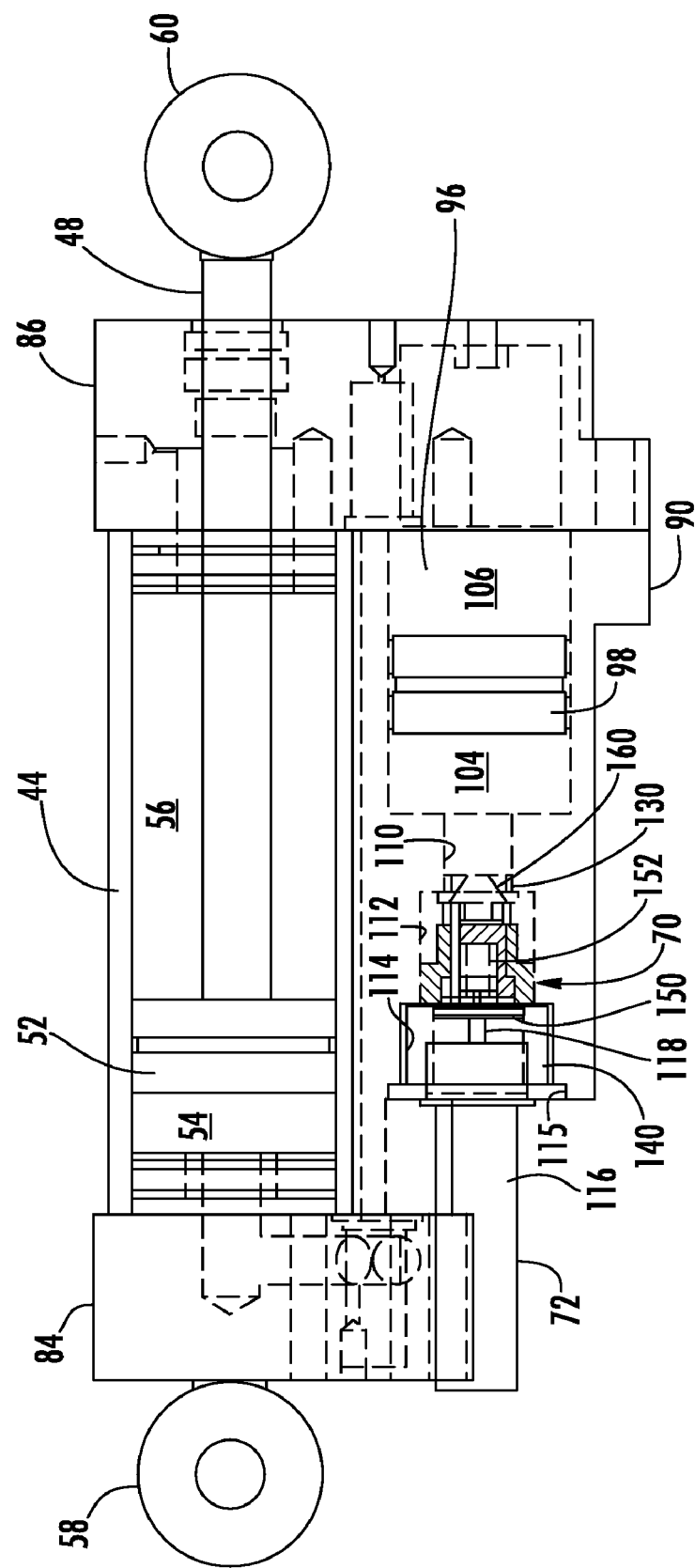
FIG. 6 is a partially sectional view of a suspension control unit showing select internal components.

In this embodiment, the amount of force required to retract the poppet 160 and thereby open the fluid outlet 82 is primarily controlled by the solenoid 72. As shown in FIG. 6, the solenoid 72 is mounted behind the relief valve 70. The solenoid 72 indirectly engages the poppet 160 via the control valve damper 150 and its decoupling member 152. The control valve damper 150 and decoupling member 152 of this embodiment are largely identical in function and construction to the corresponding components described in detail in U.S. Pat. No. 6,502,837, which as noted above is incorporated herein by reference in its entirety. In operation, movement of the poppet 160 can occur only with movement of the solenoid rod 118, subject only to any movement that may result from deformation of the decoupling member 152. By varying the signal applied to the coil 116 of the solenoid 72, the central controller 14 is able to control the resistance to movement of the poppet 160 provided by the solenoid 72 (described in more detail below). This, in effect, gives the central controller 14 the ability to control the damping forces on the compression chamber 54 and the rebound chamber 56 of the damper 40.

In this embodiment, the accumulator 62, among other things, receives fluid displaced by the movement of the rod 48. More specifically, the accumulator 62 accommodates for the difference in volume between the compression chamber 54 and the rebound chamber 56 caused by the presence of the rod 48. For example, as movement of the piston 52 causes the compression chamber 54 to shrink and the rebound chamber 56 to grow, the presence of rod 48 prevents the rebound chamber 56 from receiving all of the fluid discharged from the compression chamber 54. This causes a proportional amount of fluid to be stored in the accumulator 62. On the other hand, when movement of the piston 52 is in the opposite direction, the amount of fluid discharged from the rebound chamber 56 is smaller than the amount of fluid required to fill the compression chamber 54 so the additional required fluid is provided by the accumulator 62. Although the configuration of the accumulator 62 may vary from one application to the next, the accumulator of the illustrated embodiment is, as noted above, a generally conventional Nitrogen-charged accumulator.

As noted above, the central controller 14 controls operation of the individual suspension control units 12a-d by sending control signals to the corresponding pressure regulators 64. These control signals cause the pressure regulators 64 to vary the restriction on fluid flow between the compression chamber 54 and the rebound chamber 56, and hence vary the damping force of the suspension control units 12a-d. In this embodiment, the control signals applied to the suspension control units 12a-d are derived by the central controller 14 using a collection of algorithms that incorporate a variety of information provided by the various sensors. In this embodiment, the algorithms are separately run for each suspension control unit 12a-d to provide control signals that are uniquely calculated for each suspension control unit 12a-d. As described in more detail below, this embodiment incorporates select algorithms that use a subset of wheel position, steering angle, vehicle speed and wheel velocity to compute two separate duty-cycle components, a compression duty-cycle component and a rebound duty-cycle component. This embodiment also includes other algorithms that incorporate a vehicle speed factor to address the idea that improved performance may be achieved by applying higher damping forces at higher speeds. The central controller 14 sums the individual compression duty-cycle components and summing the individual rebound duty-cycle components. The larger of the compression and rebound summations is set the corresponding PWM control signal. In the illustrated embodiment, the central controller 14 cycles through the algorithms at a fixed rate of 2.5 milliseconds, which results in updated control signals being applied to each suspension control unit 12a-d every 2.5 milliseconds. The rate at which the central controller 14 cycles through the algorithms may vary from application to application. For example, a slower rate of 5 milliseconds has proven acceptable for some applications. In this embodiment, the central controller 14 varies the duty-cycle of a pulse-width-modulated ("PWM") electrical signal to control the amount of force required to move the solenoid 72 and hence the poppet 160. In this embodiment, the central controller 14 applies separate 4 KHz PWM signals to each solenoid 72. The frequency of the PWM signals may vary from application to application, or the system may use other types of control signals.

In this embodiment, the system includes four wheel position sensors 16a-d, a steering angle sensor 18, a two axes accelerometer 20, a brake sensor 22, an ignition sensor 24, a speed sensor 26 and four solenoid feedback sensors 28a-d. More specifically, the wheel position sensors 16a-d apprise the algorithms of the corner wheel positions, the accelerometer 20 contributes to the pitch and roll controls, the brake sensor 22, ignition sensor 24, and speed sensor 26 are vehicle inputs that contribute to various algorithms and the solenoid feedback sensors 28a-d can be polled to determine if certain fault conditions exist in the solenoids. The wheel position sensors 16a-d are located near the wheels 402 at the four corners of the vehicle 400. Each of these sensors 16a-d provides a signal indicative of the position of the corresponding wheels 402 with respect to the frame 406. In the illustrated embodiment, the wheel position sensors 16a-d are conventional rotary position sensors, which are available from a variety of well known suppliers, including Hadley Products (www.hadley-products.com). A conventional sensor of this type provides a voltage output that is proportional to the angle displaced from origin. This signal can be supplied to an A/D port (not shown) on the central controller 14. In this embodiment, the wheel position sensors 16a-d are mounted between the frame 406 and the control arm (not shown, but part of the unsprung mass). The steering angle sensor 18 may also be a conventional rotary position sensor. The steering angle sensor 18 may be mounted between the frame 406 and the steering bell crank (not shown). The two axes accelerometer 20 is configured to provide signals indicative of the roll acceleration and the pitch acceleration. The accelerometer 20 may be mounted on the board of the central controller 14 or in other flat locations around the vehicle 400. The accelerometer may be a conventional dual-axis accelerometer that provides pulse-width modulated signals to the central controller 14. For example, the accelerometer may be Model No. ADXL202AE available from Analog Devices. The brake sensor 22 of this embodiment provides a signal indicative of the brake light status. In this embodiment, the central controller 14 receives input from the wire to the brake light. The ignition sensor 24 provides a signal indicative of the vehicle's ignition. In this embodiment, the central controller 14 receives input from an ignition wire. The speed sensor 26 is also a vehicle output drawn. The central controller 14 receives a signal indicative generated by the vehicle's speedometer. The four solenoid feedback sensors 28a-d of this embodiment are sensed output signals from the control signal driver circuitry. It is a diagnostic feedback signal and provides a current proportional to the load current at the solenoid. If the solenoid is firing up successfully, a load current would occur at the solenoid and the fault logic would determine that there is no fault. More specifically, the central controller 14 applies a load to the solenoids 72 and evaluates the current response of the solenoids 72. If the solenoid 72 has a short or an open circuit, the fault logic of the central controller 14 will recognize that the current is not proportional to the load current and will take appropriate action, for example, by illuminating a "Fault" light or halting operation of the system 10. In the illustrated embodiment, the solenoid feedback sensors 28a-d are used only at ignition to test the operation of the solenoids 72. The solenoid feedback sensors 28a-d can, however, be monitored during operation or at other times, as desired. The central controller 14 may include analog to digital circuitry for converting analog signals received from the sensors. Alternatively, sensors that provide digital signals or have integrated analog to digital converters may be used.

The central controller 14 may also include fault detection and handling routines. In this embodiment, the central controller 14 is programmed to detect faults from any of the sensors, the suspension control units 12a-d, the vehicle inputs (e.g. speed, brake and ignition) and memory. When a fault is detected by the central controller, the central controller may illuminate a "fault" light placed in a visible location near the driver. If the system 10 undergoes complete failure, it will behave much like a conventional passive suspension system until it is serviced. To facilitate servicing, the central controller 14 may include a serial interface that permits the system to be analyzed using an external diagnostics computer.

III. Control Algorithms.

Operation of the system 10 may be controlled using software, firmware or other control logic contained on the central controller 14 or in another controller. One embodiment of the control logic is described herein for purposes of disclosure. The control logic may, however, be implemented in a wide variety of ways and the present invention should not be limited to the specific logic of the described embodiment.

Figure 15:
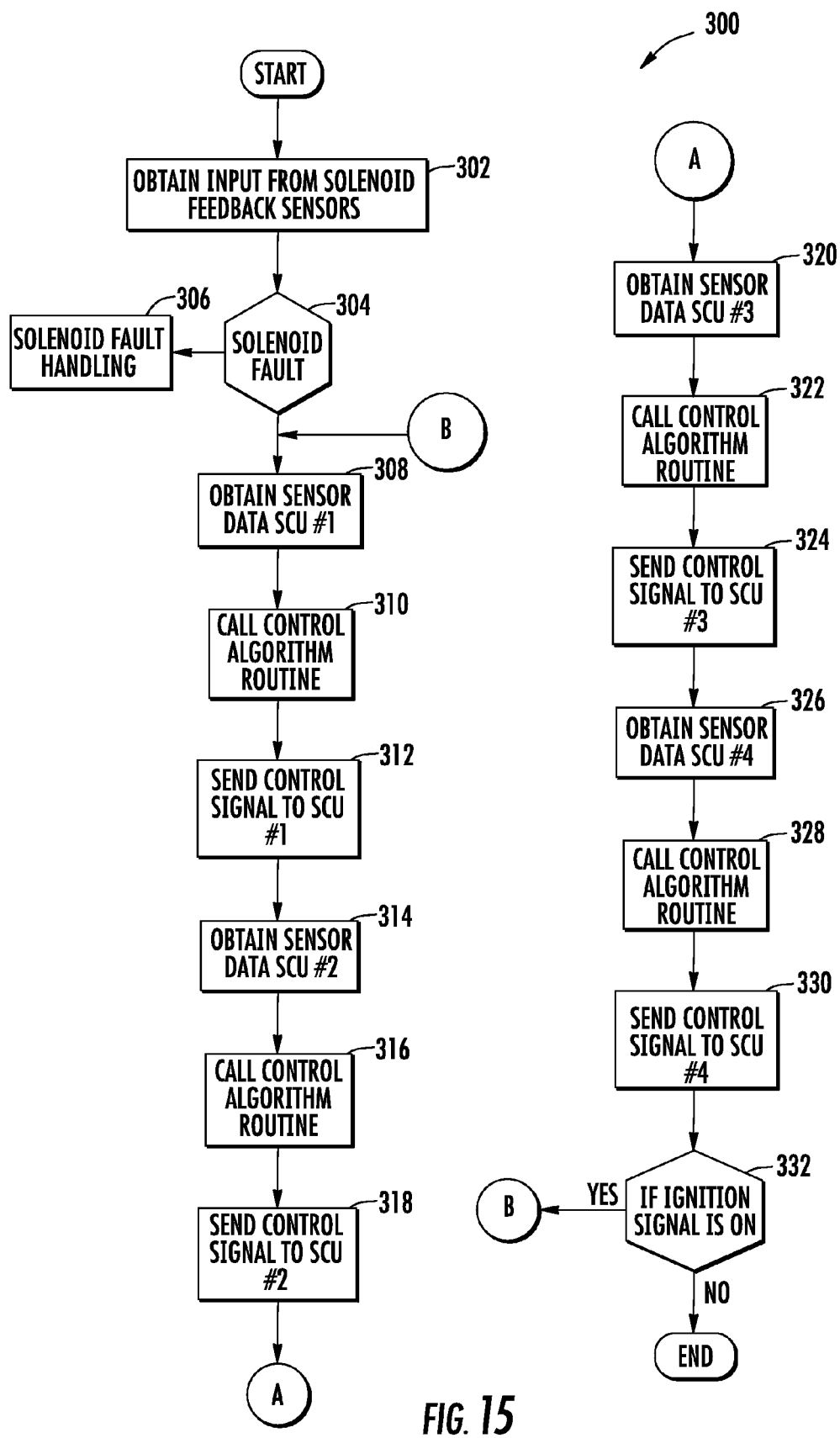
FIG. 15 is a flow chart showing the general steps in the operation of the control system.
Figure 16:
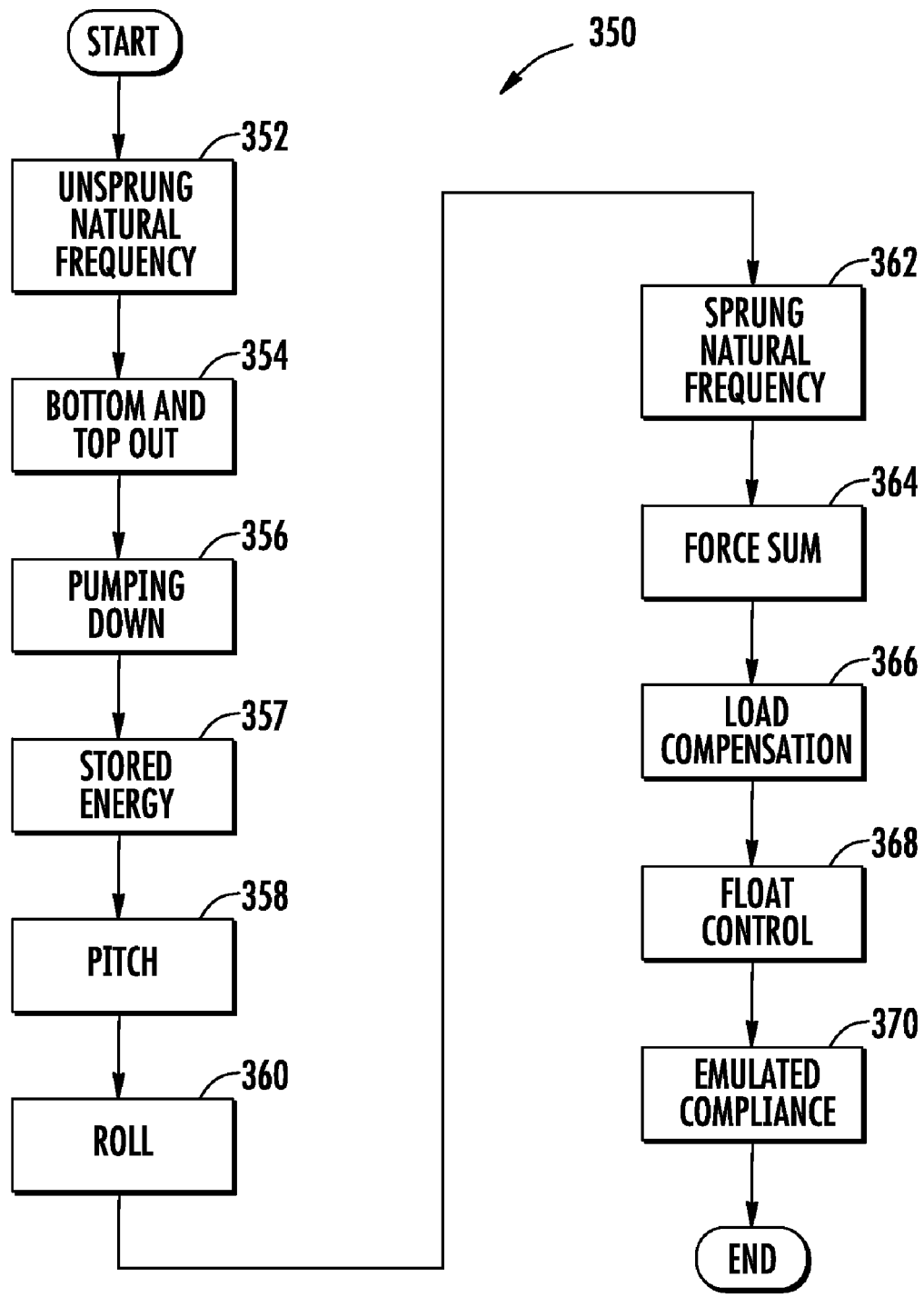
FIG. 16 is a flow chart showing the general steps involved in determining the control signals using the control algorithms.

In one embodiment, the control logic is divided into two general routines, including a central routine 300 and a control algorithm routine 350 that is periodically called by the primary routine. The primary steps of the central routine 300 are shown in FIG. 15. The central routine 300 begins by obtaining feedback from the feedback sensors 302. The feedback is analyzed 304 to determine if one or more of the solenoids 72 are in a fault condition. If so, appropriate fault handing 306 routines are entered. For example, the system 10 may be shut down or a "fault" may be reported to the user. The central routine 300 may include additional start-up fault logic, if desired. If there is no solenoid fault, the central routine 300 obtains sensor data 308 for the first suspension control unit 12a. The central routine 300 then calls 310 the control algorithm routine 350. The central routine 300 passes the sensor data for the first suspension control unit 12a to the control algorithm routine 350 so that the control algorithm routine 350 computes control signals specific for that suspension control unit 12a. After the control algorithm routine 350 is complete, the computed control signal is returned to the central routine 300. The central routine 300 then applies the returned control signal to the solenoid 72 of suspension control unit 12a. The central routine 300 and/or the control algorithm routine 350 may include fault logic for assessing the presence of any fault conditions in the various sensors. After the control signals have been applied to the first suspension control unit 12a, the central routine 300 obtains sensor data 314 for the second suspension control unit 12b, calls 316 the control algorithm routine 350 with the new data and applies 318 the returned control signal to the solenoid 72 of the second suspension control unit 12b. Next, sensor data is obtained 320 for the third suspension control unit 12c, the control algorithm routine 350 is called 322 with the new sensor data and the returned control signal is applied 324 to the solenoid 72 of the third suspension control unit 12c. The steps are repeated for the fourth (and final) suspension control unit 12d-sensor data is obtained 326 for the fourth suspension control unit 12d, the control algorithm routine 350 is called 328 with the new sensor data and the returned control signal is applied 330 to the solenoid 72 of the fourth suspension control unit 12d. The central routine 300 then determines if the vehicle ignition is still on. If so, the central routine 300 repeats steps 308-332. The loop continues until repeatedly until the ignition is off.

The control algorithm routine 350 includes a plurality of separate algorithms that are used to calculate the control signals based on the collected sensor data. The primary steps of the control algorithm routine 350 include the steps of sequentially executing the unsprung natural frequency algorithm 352, bottom and top out algorithm 354, pumping down algorithm 356, stored energy algorithm 357, pitch algorithm 358, roll algorithm 360, sprung natural frequency algorithm 362, force sum algorithm 364, load compensation algorithm 366, float control algorithm 368 and the emulated compliance algorithm 370. The computed control signal is returned to the central routine 300.

As noted above, the control algorithms are described in detail in U.S. Pat. No. 6,502,837 to Hamilton et al, which issued Jan. 7, 2003, the content of which is incorporated herein by reference in its entirety. The algorithms applied in the described embodiment of the present invention are essentially identical to those described in U.S. Pat. No. 6,502,837, except the extent described herein. As noted above, one of the differences between the present invention and the system of U.S. Pat. No. 6,502,837 is that, in one embodiment, the present invention uses a single central controller 14 to process the sensor signals and create control signals for each of the suspension control units 12a-d. To accommodate this change, the central controller 14 is configured to run the various algorithms separately for each suspension control unit 12a-d. Another difference between the present invention and the system of U.S. Pat. No. 6,502,837 is that, in one embodiment, the fluid control circuit includes only a single pressure regulator and therefore does not require separate control signals for separate compression and rebound pressure regulators. To accommodate this change, the central controller 14 is configured to run the algorithms separately to generate separate compression and rebound signals as disclosed in U.S. Pat. No. 6,502,837. However, once the separate compression and rebound signals are generated, the central controller 14 performs a comparison of the two signals and, in this embodiment, applies the greater of the two control signals to the solenoid 72 of the pressure regulator 64. In this way, the central controller 14 sequentially and repeatedly calculates a single control signal to be applied to each suspension control unit 12a-d. The general operation of the control algorithms are described below.

A. Unsprung Natural Frequency Algorithm

The UNF algorithm operates to address oscillations in the wheels and axles. Experience has revealed that oscillations in the wheels and axles typically occur at 10 Hz and therefore, in this embodiment, the system is configured to ignore lower frequency oscillations while producing damping forces proportional to the higher frequency oscillations. The wheel position alludes to oscillations of both the sprung and unsprung masses. Therefore, a Discrete Fourier Transform filter ("DFT") is used to assign weight to the wheel position using normalized lookup sine and cosine tables. In this way, the wheel position at the center frequency of 10 Hz is assigned the maximum weight while wheel position at lower frequencies receives less weight—causing the wheel position at 10 Hz to dominate over lower frequencies. After additional SNF noise is subtracted from the filtered wheel position, the compression and rebound duty-cycle components are computed as a function of wheel velocity, this filtered wheel position, and a speed factor.

B. Bottom and Top Out Algorithm

This algorithm computes the damping response to counteract any "bottoming" or "topping" situation. The term "bottoming" refers to the upper limit capability of the suspension system (e.g. the piston 52 reaching the bottom end of the internal space 46 of the cylinder 44) and "topping" refers to the lower limit travel of the suspension system (e.g. the piston 52 reaching the top end of the internal space 46 of the cylinder 44). The suspension system is in danger of "bottoming" or "topping" if a wheel nears the suspension system limit and is doing so at a dangerously high speed. The algorithm responds with compression and rebound duty-cycle components that relate wheel position and wheel velocity relative to the set threshold limits of the SCUs and also a speed factor.

C. Pumping Down Algorithm

The system can pull the vehicle downward when influenced by the apposite road conditions. Originating primarily from UNF oscillations induced by short bumps, the system applies damping forces to eliminate UNF. However, the oscillations are actually the high frequency road bumps and the system consequently over-compensates the damping response, and as a result the vehicle is pulled downward. This algorithm utilizes the difference of average wheel position over an extended period of time and ride height, subtracting an amount proportional to this difference from the UNF rebound component.

D. Pitch Algorithm

In general, this algorithm counters the tendency of the vehicle to dive and squat during hard brakes and accelerations respectively. The pitch acceleration is negative during a dive (the front of the vehicle is being pulled downward) and positive during a squat (the front of the vehicle is being pulled upward). The brake sensor and vehicle speed sensor are used in conjunction with the sign of the pitch acceleration to determine if the vehicle is experiencing diving, squatting or neither.

The algorithm process involves computing the amount of anti-pitch force required in overcoming (1) pitch acceleration ("Sensor Force"), (2) diagonal wheel position difference ("Positional Force"), and (3) the average rate of change of pitch acceleration ("Acceleration Rate Force"). Although the Sensor Force is the main contributing force in many applications, the Positional Force and Acceleration Rate Force are used as corrective forces to improve accuracy. For example, if the vehicle is experiencing a larger difference in diagonal wheel position than indicated by pitch acceleration, then the Positional Force can correct the underestimation of the Sensor Force. The three forces are computed independently for the compression and rebound components.

The process concludes by determining the rebound and compression duty-cycle components. If the vehicle is experiencing positive pitch acceleration and the diagonal wheel position difference indicates the same, then the vehicle must be squatting. It follows then that the rear corners will require compression duty-cycle related to a speed factor and the compression components of the Sensor Force, Positional Force, and Acceleration Rate Force, while the front SCUs will require a rebound duty-cycle dependent on the speed factor and the rebound components of the three forces. On the other hand, if the vehicle is experiencing negative pitch acceleration and the diagonal wheel position difference indicates the same, then the vehicle must be diving and the front two SCUs are now in compression while the rear two SCUs are in rebound. The other less likely cases are handled similarly—by determining if the vehicle is squatting or diving and then calculating the appropriate compression and rebound duty-cycle components.

E. Roll Algorithm

The algorithm is similar to the Pitch Algorithm and it counters the tendency of the vehicle to lean towards the left or right during corner turns. A left turn (negative steering angle) causes the vehicle to lean to the right producing negative roll acceleration while a right turn (positive steering angle) causes the vehicle to lean to the left producing positive roll acceleration. In deriving the anti-roll force, the algorithm assigns the higher of roll acceleration and steering acceleration to "Vehicle Roll." Steering acceleration describes the amount of vehicle speed moving toward the current steering angle and is the product of the steering angle and vehicle speed. In other words, steering acceleration is also indicative of rolling—the sharper the vehicle is turning and the greater the speed at which the turn is taken results in higher roll—and the maximum is used because any roll being experience is assumed to be primarily caused by the maximum.

The next part of the process involves calculating the Sensor Force, Positional Force, and Acceleration Rate Force. The Sensor Force is proportional to the Vehicle Roll, the Positional Force is proportional to the opposite wheel position difference, and the Acceleration Rate Force is proportional to the average rate of change of Vehicle Roll. The Sensor Force is the main contributor to the anti-roll force while the Positional Force and Acceleration Rate Force are corrective contributors. With independent compression and rebound components for each of the duty-cycle forces, the next stage of the algorithm will appropriately compute the final anti-roll forces.

The algorithm completes by determining final compression and rebound duty-cycle components. If the Vehicle Roll is positive (right turn) and the opposite wheel position difference is the same, then the vehicle is leaning to the left. With the left two corners in compression and the right two corners in rebound, appropriate compression and rebound components are found as a function of a speed factor, the Sensor Force, Positional Force, and Acceleration Rate Force. Note that the compression component is applied to the left two SCUs and the rebound component is applied to the right two SCUs for this case. Similarly, a negative roll (left turn) and the opposite wheel position difference is also the same (negative) then the vehicle is rolling right. A different course of action is taken for this case, since the right two SCUs are now in compression while the left two SCUs are in rebound. The other possible cases result in similar steps to deriving the final duty-cycle components.

F. Sprung Natural Frequency Algorithm

The Sprung Natural Frequency Algorithm minimizes oscillations in the vehicle body and frame. Empirical data shows the oscillations to occur at 1 Hz in the described application. The idea then is to ignore higher frequency oscillations while lower frequency oscillations are used to indicate the amount of anti-SNF forces required by the system. The common and differential wheel positions define the oscillations in the common and differential mode. The common mode is the average of the front or rear opposite wheel positions while the differential mode is the difference of these two opposite wheel positions. A DFT filter is then used with normalized lookup sine and cosine tables to weight the two modes, so that common and differential wheel positions at 1 Hz dominate over higher frequency values. After eliminating UNF noise by subtracting a proportional amount from the filtered common and differential wheel positions, the final compression and rebound duty-cycle components are computed based on wheel position, filtered wheel position and a speed factor for each mode.

G. Force Sum Algorithm

The algorithm task at this point has computed the compression and rebound duty-cycles for the unsprung natural frequency, bottom and top out, pumping down, pitch, and sprung natural frequency algorithms. The laws of Physics allow summing all the individual duty-cycle forces of the compression and rebound components to derive total compression and rebound sums. The algorithms that follow, load compensation, float, and emulated compliance, apply responses to the total compression sum and total rebound sum.

H. Load Compensation Algorithm

When a vehicle is loaded with additional weight, higher damping responses are required. The compensation required is computed as a function of integrated wheel position (average wheel position over an extended period of time) and the square of wheel velocity. These factors describe an average change in ride height in a mechanical spring system or an increase in spring pressure in an air spring system—and thus a change in total load. The compensation factor is multiplied to either the total compression sum or total rebound sum depending on wheel position—the upward movement of the wheel indicates compression and downward movement signifies rebound.

I. Float Control Algorithm

Float is the source of a bilious sensation experienced by the rider when the system is "floating on air." The system applies compression and rebound forces to the point that the wheel velocity on average (over an extended period of time) exceeds an acceptable float limit. The method compares average wheel velocity to the set float limit, and if breeched in the positive direction, additional compression component duty-cycle is added and if breeched in the negative direction, then additional rebound component duty-cycle is applied to the system. The goal is to stop the vehicle from "floating on air" by bring the average velocity to near calibration.

J. Stored Energy Algorithm

In the event that a vehicle encounters a large and abrupt road bump, the front wheels traverse upward while the rear wheels travel downward. The response may cause the vehicle to launch completely off the ground. The stored energy algorithm solves this formidable issue by applying damping forces to counter the response of the rear wheels in the rebound direction, consequently maintaining relatively flat vehicle motions. Similarly, when the rear wheels encounter the same bump, the algorithm damps the front wheels with the goal to keep the vehicle flat on the ground. The damping forces are a function of displacement of the opposite end of the vehicle.

K. Emulated Compliance Algorithm

The Emulated Compliance Algorithm provides mechanical compliance, which is desirable during the period in which the shock-travel direction transitions from compression to rebound or from rebound to compression (before and after a road irregularity). The system attempts to maintain a constant force to avoid harshness. However, during transition the damping force cannot remain constant, since the damping force being applied prior no longer corresponds correctly to the direction of shock-travel following the transition. Mechanical compliance involves emulating a hydraulic spring on the system. The algorithm applies Hooke's Law by adding and subtracting displaced wheel movement of a simulated spring in the opposed rebound and compression directions, hence producing proportional damping forces to eschew the discomfort from shock-travel transitions as desired.

Once the algorithms are completed, the separate compression and rebound values are compared. The central controller 14 applies the greater of the two signals to the solenoid of the corresponding suspension control unit. In this embodiment, the signal is applied as a pulse-width-modulated signal in which the duty-cycle is varied to control the force required to move the solenoid. For example, by the inherent operational characteristics of the conventional solenoids used in the present invention, a PWM signal with a greater duty cycle will result in greater resistance to movement of the solenoid, while a PWM signal with a lesser duty cycle will result in lesser resistance to movement of the solenoid. These different signals in turn result in greater or lesser restriction on the flow of fluid between the compression chamber 54 and the rebound chamber 56.

Although a variety of control algorithms are described, the present invention does not necessarily require implementation of all of these algorithms in all applications. Further, it may be desirable in certain application to include additional algorithms to account for additional conditions in making damping control decisions. Accordingly, the present invention is not limited to the implementation of the specific algorithms set forth herein.

In one alternative embodiment, the control software is configured with interrupt tasks to provide more precise control over timing, including timing of the control algorithms. In this embodiment, the software begins by carrying out a series of initializing operations, which include initialization of variables and execution of select fault logic. The software may include additional "start up" operations as desired. Operation then passes to a program loop ("Main Loop") that will repeat continuously until the ignition is shut off. The Main Loop may carry out essentially any operations that require repetition, but are not as time sensitive as the interrupt tasks. For example, the Main Loop may include, among other things, fault detection logic, programming to convert sensor values into a meaningful form for processing by the rest of the system, code to monitor the ignition to turn off the system when the ignition has been off for a specified period of time and programming to execute any desired blink-code logic utilized for service diagnostics. The software further includes a number of interrupt tasks that, when triggered, temporarily interrupt operation of the Main Loop. The interrupt tasks may include timer-based interrupt tasks and event-based interrupt tasks. In this embodiment, the control algorithms are included in a timer-based interrupt task ("Corner Task") that, in this embodiment, executes every 2.5 milliseconds. The repeat timing of the Corner Task may vary from application to application. When the appropriate period of time has passed, an interrupt is issued and control passes from the Main Loop to the Corner Task. The Corner Task may vary the frequency of execution of the various algorithms. For example, the Corner Task may execute some of the control algorithms each time that the task is called, and execute other control algorithms every other time that the task is called. The frequency of repetition may be selected based on the timing requirements necessary to obtain the desired operation. In this embodiment, the Corner Task executes code to precondition the values derived from the wheel position sensors and the speed input, and to convert any analog signals to digital signals for use by the rest of the system, during each iteration (e.g. every 2.5 milliseconds). The Corner Task also executes the unsprung natural frequency algorithm, the bottom top out algorithm, the load compensation algorithm and the emulated compliance algorithm during each iteration. Every other iteration (e.g. each 5 milliseconds), the Corner Task executes the pumping down algorithm, the pitch algorithm, the roll algorithm, the sprung natural frequency algorithm and the stored energy algorithm. At the same time (e.g. every 5 milliseconds), the control software may execute code to precondition the pitch and roll values, and to precondition the steering angle position value. In this embodiment, the control software may utilize event-based interrupt tasks to obtain signals from various sensors. For example, the values of the pitch axis of the accelerometer, the roll axis of the accelerometer, the clock input and the vehicle speed input may be collected by the system using conventional event-based interrupt logic. Although this alternative embodiment is described as having repeat rates of 2.5 milliseconds for certain tasks and 5.0 milliseconds for others, the repeat rates may vary from application to application as determined to provide the desired performance.

IV. Summary of General Operation.

Figure 7A:
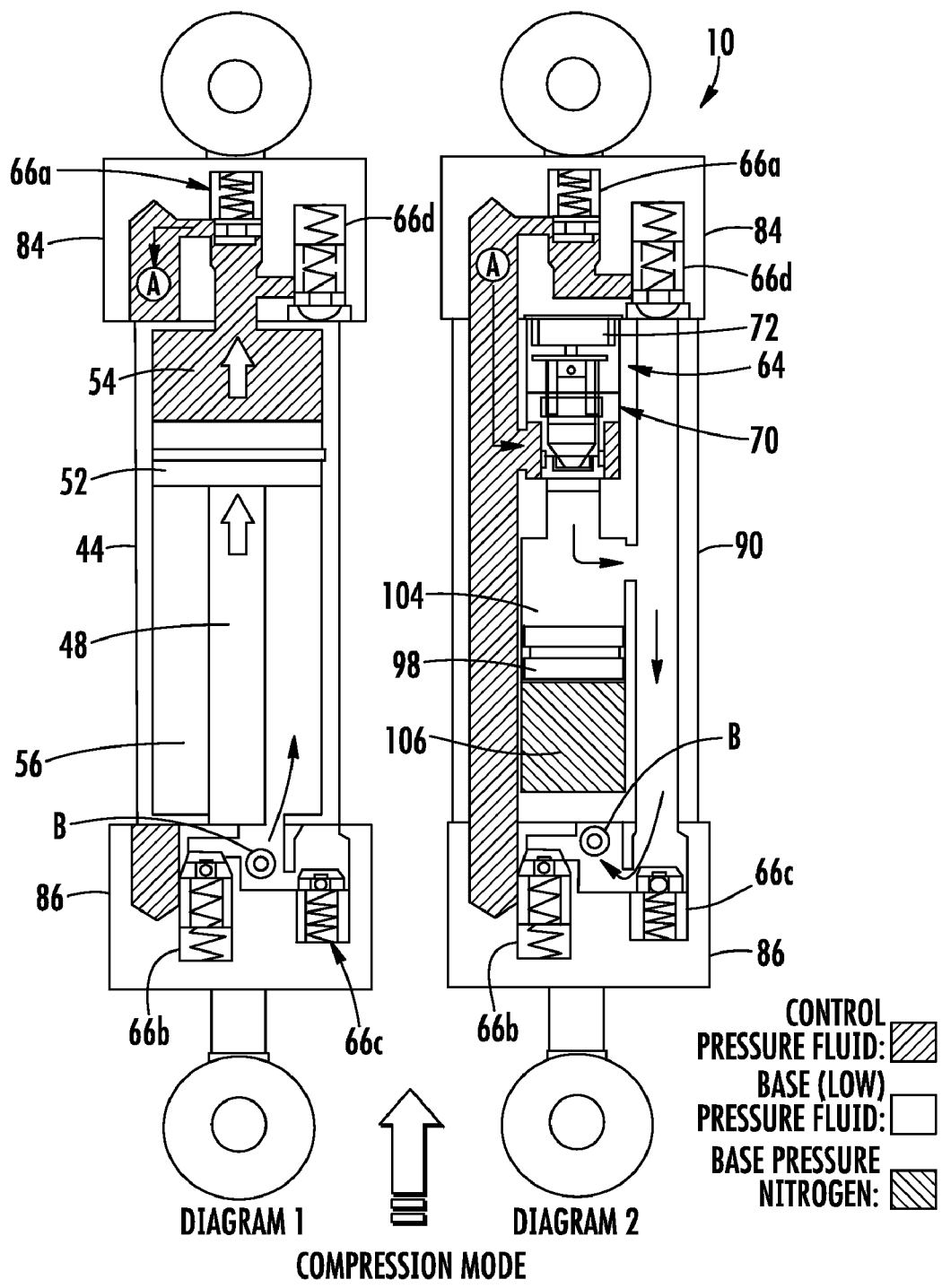
FIG. 7A is a representational sectional view of a suspension control unit showing fluid flow during compression.
Figure 7B:
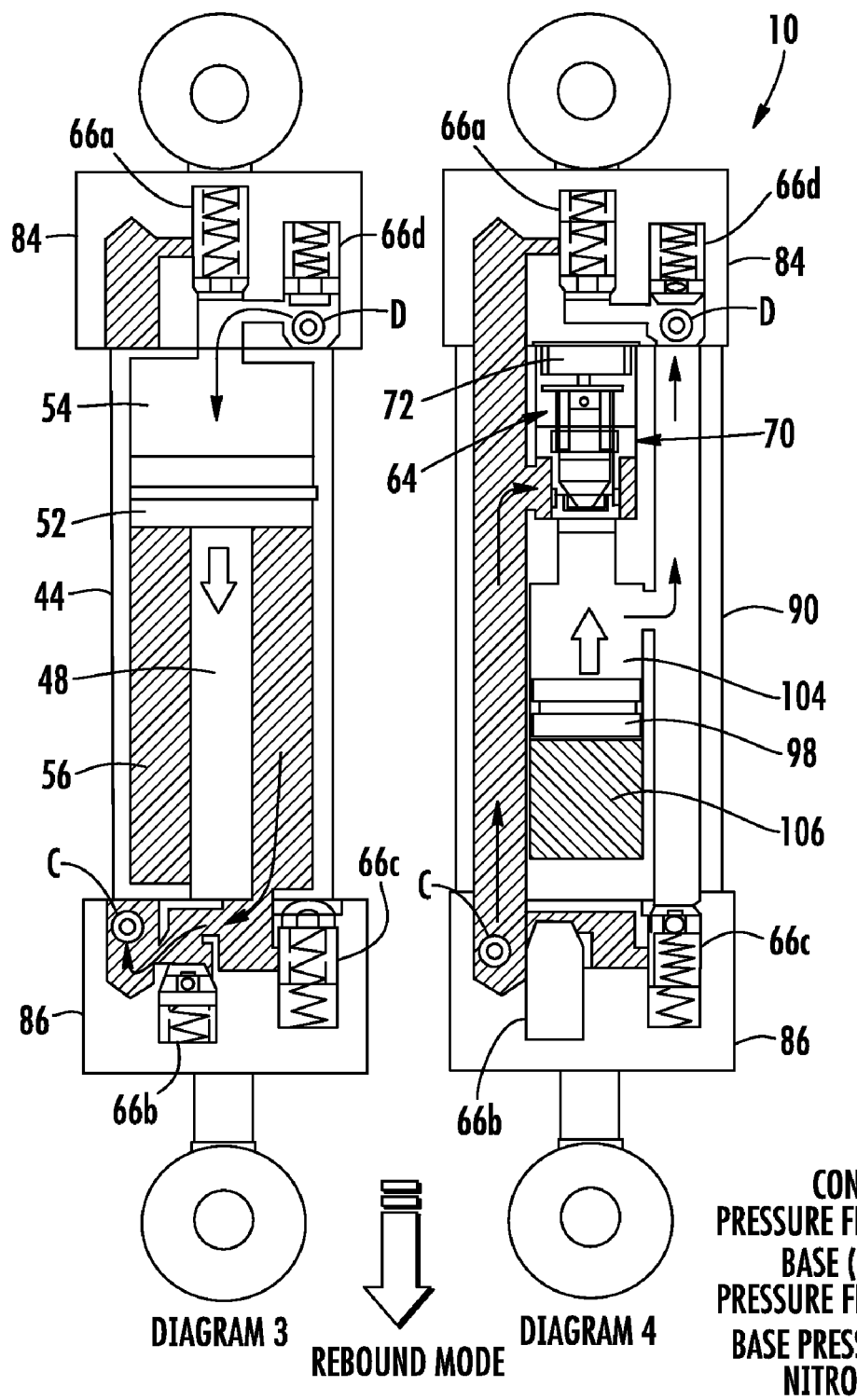
FIG. 7B is a representational sectional view of a suspension control unit showing fluid flow during rebound.

The general operation of the system 10 will now described in connection with select road conditions that may be encountered by the vehicle. Operation of the system 10 will be described with reference to FIGS. 7A and 7B. These drawing are cross-sectional representations of suspension control unit 12a. The representations include two cross-sectional representations, one intended to illustrate the flow paths on the damper side of the unit and the other to show the flow paths on the accumulator/pressure regulator side of the unit. The two representations are to be viewed in conjunction to illustrate the complete flow path. The system 10 responds to a compressed wheel (due to a road bump) by building pressure against the pressure regulator 64 in the suspension control unit 12a-d. The relief setting of the valve 70 is commanded by the single-valve solenoid 72 that is driven by the compression duty-cycle component computed by the central controller 14. The build up of pressurized oil against the valve 70 generates a linearly proportional force that opposes piston movement, consequently damping the system. Following the bump, the wheel returns to ride height position and oil is pressurized against the pressure regulator 64 until the relief pressure dictated by the rebound component duty-cycle has been contravened. Consequently, a linearly proportional force opposing the rebound direction damps the system 10. Instead, if the vehicle encounters a pothole, the process reverses with rebound occurring first followed by compression.

In greater detail, the event of a road bump pushes the wheel upward. This causes the rod 48 to traverse upward by a proportional amount and the oil in the compression chamber 54 is pressurized as the piston 52 moves aloft. Consequently, the oil leaves the compression chamber 54, passes through check valve 66a, and is then pushed against the pressure regulator 64. The PWM signal generated by the central controller 14 drives the single-valve solenoid 72 thus controlling the relief pressure setting. The oil pressure generates a compression damping force that counters the piston 52 until the relief setting is reached, at which point the oil is allowed to flow through the pressure regulator 64, with the valve 70 closing once oil pressure has returned to levels below the relief pressure setting. This further reduces harshness in the ride because the system 10 maintains constant pressure and force, only adding and subtracting from the current force to avoid drastic force adjustments. Next, the oil flows towards the path of least pressure, in this case through check valve 66c, to fill the rebound chamber 56 with the equivalent volume to that displaced initially. However, the rod 48 currently occupies volume in the damper 40 which cannot be filled with oil. This remaining oil instead flows to the accumulator 62. As noted above, the accumulator 62 is charged with Nitrogen gas to provide compressibility to sustain pressure on the oil. After the vehicle 400 passes the bump, the wheel 402 returns to ride height and the rod 48 and piston 52 rebound. The oil in the rebound chamber 56 is now pressurized and is forced to exit the damper 40. After passing check valve 66b, the oil stops again at the pressure regulator 64, hence slowing the piston 52 in the rebound direction by a rebound damping force. When the computer-controlled relief pressure is surpassed, the oil travels through the pressure regulator 64 until the oil pressure returns to levels below the relief pressure setting, allowing the remaining oil to flow through check valve 66d, as well as the oil stored in the accumulator 62 from earlier—because the rod no longer occupies as much of the internal space 46—refilling the compression chamber 54. The process is reversed for pot holes since the wheel 402 rebounds first and then compresses.

V. Optional Ride Control Setting

In one alternative embodiment, the system 10 may include a ride control setting that permits the user to increase or decrease the "stiffness" or "firmness" of the ride. The ride control setting allows a user to adjust operation of the system 10 to accommodate road conditions, driving conditions, vehicle conditions (e.g. load) and other relevant conditions or simply to match the user's personal ride preference. In this embodiment, the ride control setting may include a switch or other input device that is coupled to the central controller 14 (shown in phantom lines in FIG. 1) to allow the user to specify the desired ride control setting. In one embodiment, the system 10 includes an analog to digital converter (not shown) and a potentiometer 27 or other electronic component that is electrically connected to an input of the analog to digital converter. In most applications, an analog to digital converter will already be included in the system 10 to provide analog to digital conversion of sensor inputs. In operation, the analog to digital converter converts the setting of the potentiometer 27 into a digital value. This digital value is then utilized in the control software to scale the control signals applied to the pressure regulator 64. In one embodiment, the sprung natural frequency algorithm, the pitch algorithm and the roll algorithm are configured to incorporate the ride control setting. For example, the sprung natural frequency may be configured to scale its output value by about +/−25% and the roll and pitch algorithms may be configured to scale their output value by about +/−50%. These adjustment ranges are merely exemplary and the range of adjustability may vary from application to application as desired. Although described in connection with scaling of the sprung natural frequency, roll and pitch output values, the ride control setting can be used to scale the output values of essentially any one or more of the control algorithms. Alternatively (or in addition), the ride control setting can be use to scale the control signal (e.g. the control signal calculated as a function of the output values of the various control algorithms). As an alternative, the potentiometer may be replaced by one or more other analog or digital components that are capable of specifying a ride control setting to the central controller 14. For example, the system 10 may include a digital interface that is capable of providing the central controller 14 with a digital input representative of the desire ride control setting. In an alternative embodiment, the ride control setting can be input into the system using an interface on the central controller 14, such as a conventional serial interface (not shown). In this embodiment, a technician or other individual can connect to the central controller 14 with a computer, such as a laptop, using the interface and conventional interface software. The individual can then input the desired ride control setting into the central controller 14 for use in affecting ride as discussed above.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A ride control suspension control system for a vehicle comprising:
   a plurality of sensors providing sensor signals indicative of a plurality of conditions;
   a suspension control unit mounted between a sprung mass and an unsprung mass, said suspension control unit including a damper having a compression chamber and a rebound chamber, said suspension control unit further including a fluid control circuit selectively providing fluid communication between said compression chamber and said rebound chamber, said fluid control circuit including a single pressure regulator to selectively restrict flow of fluid from said compression chamber to said rebound chamber and from said rebound chamber to said compression chamber;
   a controller for controlling operation of said pressure regulator as a function of said sensor signals;
   wherein said pressure regulator includes an inlet and an outlet; said fluid control circuit including a first fluid path interconnecting said inlet and said compression chamber, said first fluid path including a first one-way component preventing fluid flow directly from said inlet to said compression chamber; and
   wherein said fluid control circuit includes a second fluid path interconnecting said outlet and said rebound chamber, said second fluid path including a second one-way component preventing fluid flow directly from said rebound chamber to said outlet.

2. The system of claim 1 wherein said fluid control circuit includes a third fluid path interconnecting said inlet and said rebound chamber, said third fluid path including a third one-way component preventing fluid flow directly from said inlet to said rebound chamber.

3. The system of claim 2 wherein said fluid control circuit includes a fourth fluid path interconnecting said outlet and said compression chamber, said fourth fluid path including a fourth one-way component preventing fluid flow directly from said compression chamber to said outlet.

4. The system of claim 3 wherein said fluid control circuit includes an accumulator in fluid communication with said second fluid path and said fourth fluid path.

5. The system of claim 3 wherein said fluid control circuit includes an accumulator in fluid communication with said compression chamber and said rebound chamber, said fourth one-way valve preventing fluid flow directly from said compression chamber to said accumulator, said second one-way valve preventing fluid flow directly from said rebound chamber to said accumulator.

6. The system of claim 5 wherein said first one-way valve, said second one-way valve, said third one-way valve and said fourth one-way valve are further defined as check valves.

7. The system of claim 6 wherein said pressure regulator includes an adjustable relief valve and a solenoid for selectively control said adjustable relief valve.

8. A ride control suspension control system for a vehicle comprising:
   a plurality of sensors providing sensor signals indicative of a plurality of conditions;
   a suspension control unit mounted between a sprung mass and an unsprung mass, said suspension control unit including a damper having a compression chamber and a rebound chamber, said suspension control unit further including a fluid control circuit selectively providing fluid communication between said compression chamber and said rebound chamber, said fluid control circuit including a single pressure regulator to selectively restrict flow of fluid from said compression chamber to said rebound chamber and from said rebound chamber to said compression chamber;
   a controller for controlling operation of said pressure regulator as a function of said sensor signals; and
   further comprising a second suspension control unit, a third suspension control unit and a fourth suspension control unit, each of said second, third and fourth suspension control units including a pressure regulator having a relief valve and a solenoid, said controller including means for providing first control signals directly to said solenoid of said first suspension unit, second control signals directly to said solenoid of said second suspension unit, third control signals directly to said solenoid of said third suspension unit and fourth control signals directly to said solenoid of said fourth suspension unit, whereby said controller provides direct control of each of said suspension control unit.

9. A suspension control unit for use in damping forces between a sprung mass and an unsprung mass in a vehicle comprising:
   a damper having a compression chamber and a rebound chamber, said damper being mountable between the sprung mass and the unsprung mass;
   a fluid control circuit defining a flow path between said compression chamber and said rebound chamber, said fluid control circuit including a single pressure regulator selectively restricting fluid flow between said compression chamber and said rebound chamber;
   a controller receiving sensor signals from a plurality of sensors and controlling operation of said pressure regulator as a function of said sensor signals, said sensors signals being indicative of road and vehicle conditions; and
   wherein said pressure regulator includes an inlet and an outlet; said fluid control circuit including a first fluid path interconnecting said inlet and said compression chamber and a second fluid path interconnecting said outlet and said rebound chamber, said first fluid path including a first one-way component preventing fluid flow directly from said inlet to said compression chamber, said second fluid path including a second one-way component preventing fluid flow directly from said rebound chamber to said outlet.

10. The system of claim 9 wherein said fluid control circuit includes a third fluid path interconnecting said inlet and said rebound chamber and a fourth fluid path interconnecting said outlet and said compression chamber, said third fluid path including a third one-way component preventing fluid flow directly from said inlet to said rebound chamber, said fourth fluid path including a fourth one-way component preventing fluid flow directly from said compression chamber to said outlet.

11. The system of claim 10 wherein said fluid control circuit includes an accumulator in fluid communication with said second fluid path and said fourth fluid path, said fourth one-way valve preventing fluid flow directly from said compression chamber to said accumulator, said second one-way valve preventing fluid flow directly from said rebound chamber to said accumulator.

12. The system of claim 11 further including a first cylinder containing said damper and a second cylinder containing said pressure regulator and said accumulator, said first cylinder and said second cylinder being adjoined at opposite longitudinal ends by a first end cap and a second end cap, said fluid control circuit being defined internal to said cylinders and said end caps.

13. A ride control suspension control system for a vehicle having a sprung mass and an unsprung mass comprising:
- a plurality of sensors for providing sensor signals indicative of road and vehicle conditions;
- a plurality of suspension control units mounted between the sprung mass and the unsprung mass, said suspension control units each including a damper having a compression chamber and a rebound chamber, said suspension control units each including a fluid control circuit defining at least one flow path between said compression chamber and said rebound chamber, each fluid control circuit including a single pressure regulator for variably controlling fluid flow in both directions between said compression chamber and said rebound chamber; and
- a central controller electrically connected to each of said plurality of sensors and to said pressure regulators of each of said suspension control units, said central controller including a processor for processing said sensor signals in accordance with a plurality of predetermined algorithms to obtain separate control signals for each of said pressure regulators said central controller including an output circuitry to transmit each of said separate control signals to a corresponding one of said pressure regulators.

14. The system of claim 13 wherein said plurality of sensors includes a plurality of position sensors mounted between the sprung mass and the unsprung mass, said positions sensors providing sensor signals indicative of the relative position between the sprung mass and the unsprung mass.

15. The system of claim 13 wherein each of said pressure regulators includes an inlet and an outlet; and
- wherein each of said fluid control circuits includes a first one-way flow path permitting fluid flow from said compression chamber to said inlet, a second one-way flow path permitting fluid flow from said rebound chamber to said inlet, a third one-way flow path permitting fluid flow from said outlet to said compression chamber and a third one-way flow path permitting fluid flow from said outlet to said rebound chamber.

16. The system of claim 15 wherein said fluid flow circuit includes an accumulator, a fifth one-way flow path permitting fluid flow from said accumulator to said compression chamber, a sixth one-way flow path permitting fluid flow from said accumulator to said rebound chamber and a two-way flow path permitting fluid flow in both directions between said accumulator and said outlet.

17. The system of claim 16 further including a first cylinder containing said damper and a second cylinder containing said pressure regulator and said accumulator, said first cylinder and said second cylinder being adjoined at opposite longitudinal ends by a first end cap and a second end cap, said fluid control circuit being defined internal to said cylinders and said end caps.

* * * * *